United States Patent [19]

Miyazawa

[11] Patent Number: 5,237,365
[45] Date of Patent: Aug. 17, 1993

[54] EXPOSURE CONTROL APPARATUS FOR CAMERA WITH SHAKE COUNTERMEASURE

[75] Inventor: Azuma Miyazawa, Tokyo, Japan

[73] Assignee: Olympus Optical Co., Ltd., Tokyo, Japan

[21] Appl. No.: 951,307

[22] Filed: Sep. 22, 1992

Related U.S. Application Data

[63] Continuation of Ser. No. 768,820, Sep. 30, 1991, abandoned.

[30] Foreign Application Priority Data

Oct. 15, 1990 [JP] Japan .................. 2-275968
Aug. 29, 1991 [JP] Japan .................. 3-218672

[51] Int. Cl.⁵ .................. G03B 7/093; G03B 17/40
[52] U.S. Cl. .................. 354/456; 354/268; 354/430
[58] Field of Search ........... 354/430, 202, 266, 267.1, 354/268, 238.1, 456, 458

[56] References Cited

U.S. PATENT DOCUMENTS

| | | | |
|---|---|---|---|
| 3,690,234 | 9/1972 | Costianes | 354/430 |
| 4,709,138 | 11/1987 | Suda et al. | 354/430 X |
| 5,012,270 | 4/1991 | Sekine et al. | 354/430 |
| 5,084,724 | 1/1992 | Maeno | 354/430 |
| 5,109,249 | 4/1992 | Kitajima | 354/430 |
| 5,130,729 | 7/1992 | Sato et al. | 354/202 |

FOREIGN PATENT DOCUMENTS 63-53531 3/1988 Japan .
64-86122 3/1989 Japan .

*Primary Examiner*—W. B. Perkey
*Attorney, Agent, or Firm*—Frishauf, Holtz, Goodman & Woodward

[57] ABSTRACT

A shake amount detecting section repeatedly detects shaking of a camera in a sampling time interval shorter than a hand shaking cycle. An exposure calculating section calculates a shutter speed based on the sensitivity of a film and the brightness of an object. A data processing section acquires processed data from a product of the shutter speed and the amount of shaking, every time the amount of shaking is detected. A storage section stores the processed data output. A shake amount predicting section receives the processed data and the processed data stored in the storage section to predict the total amount of shaking while the shutter is open, every time the processed data is output from the data processing section. A release switch instructs the beginning of an exposing operation on the film. A shutter enable discriminating section discriminates permission of a shutter release when a latest predicted total amount of shaking during shutter opening, output from the shake amount predicting section, is equal to or smaller than a predetermined amount, every time the release switch is operated and the shake amount predicting section predicts the total amount of shaking. A shutter controller starts opening the shutter based on a signal from the shutter enable discriminating section and controls an exposure time based on the shutter speed.

35 Claims, 27 Drawing Sheets

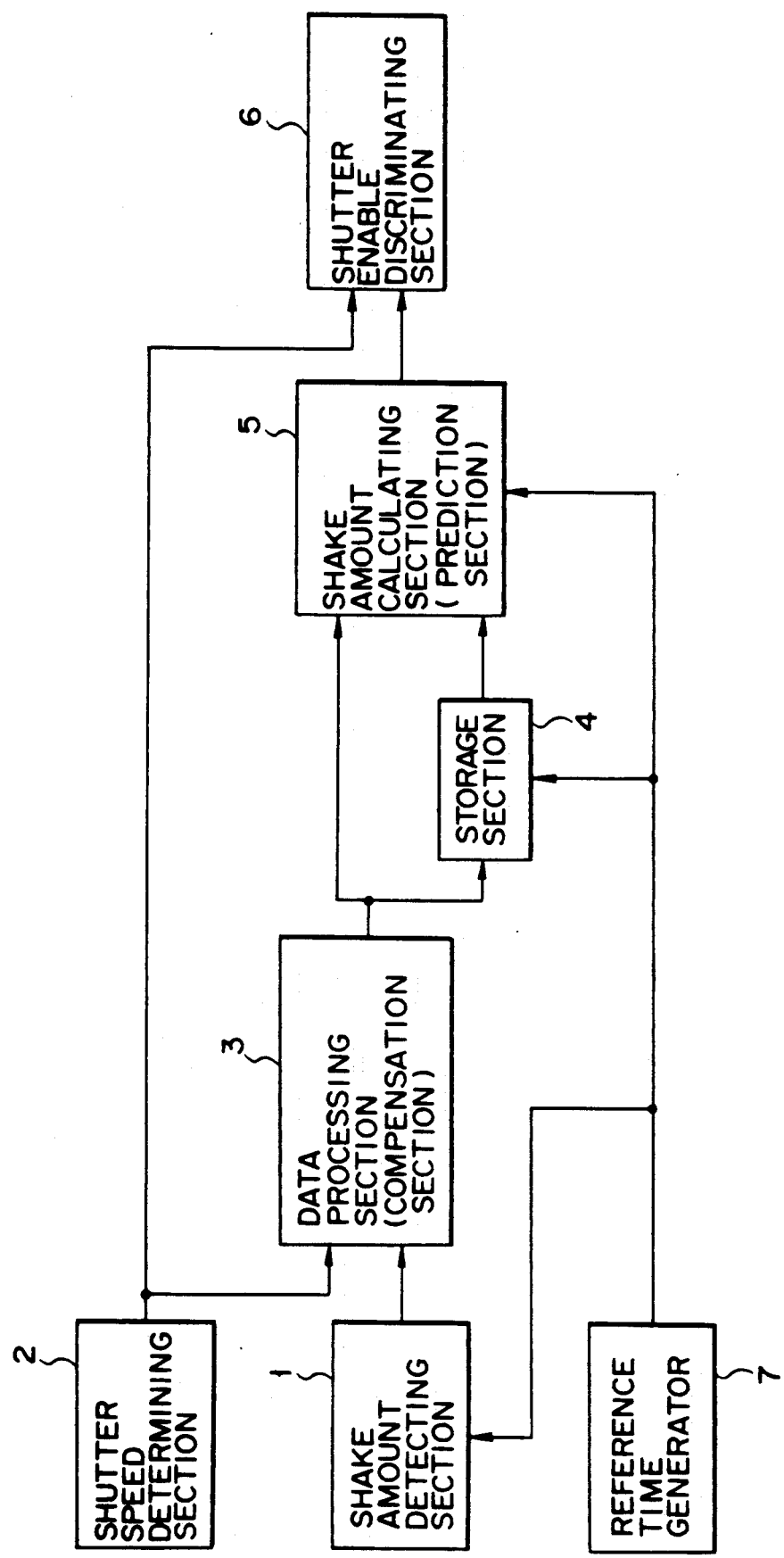
F I G. 1

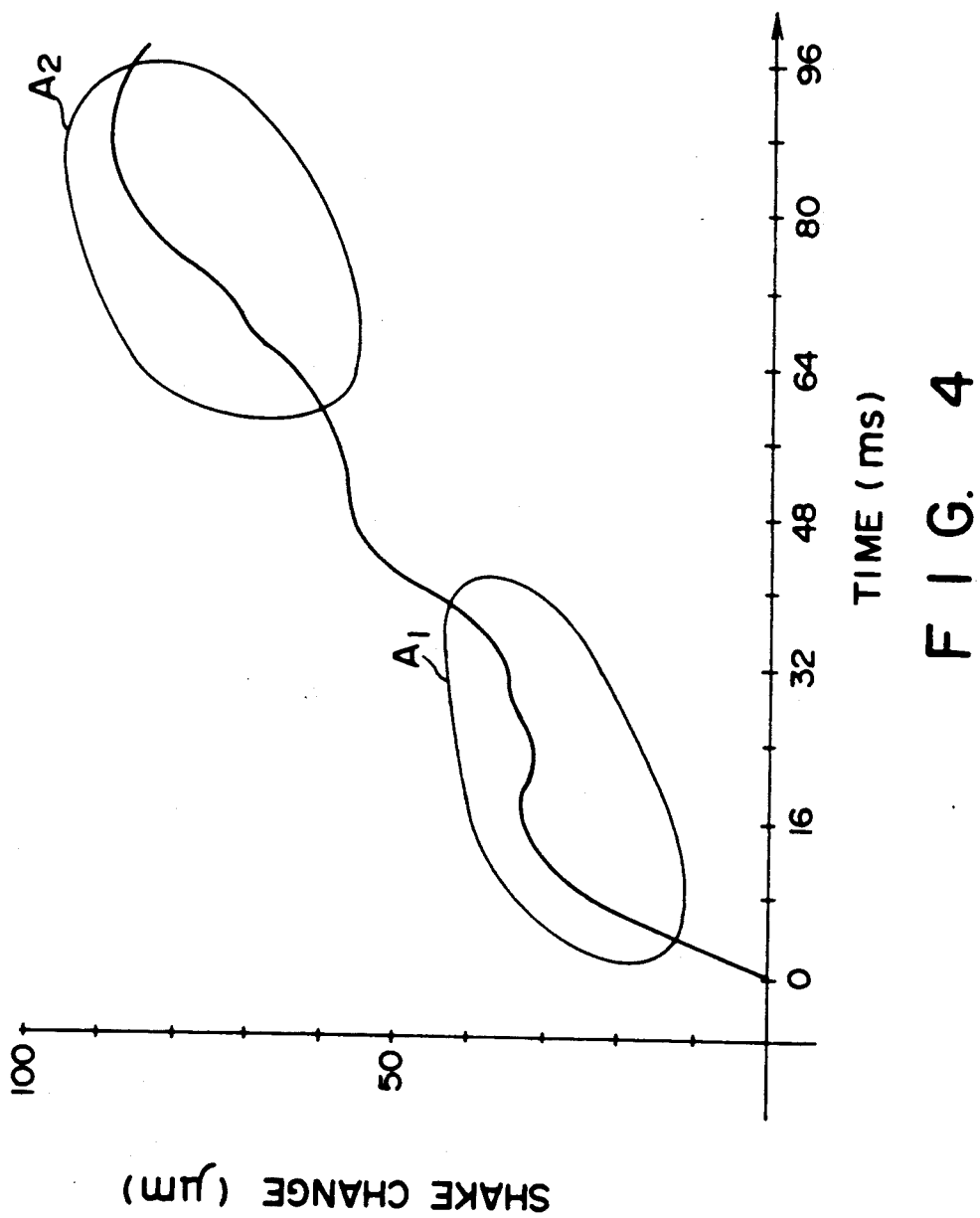

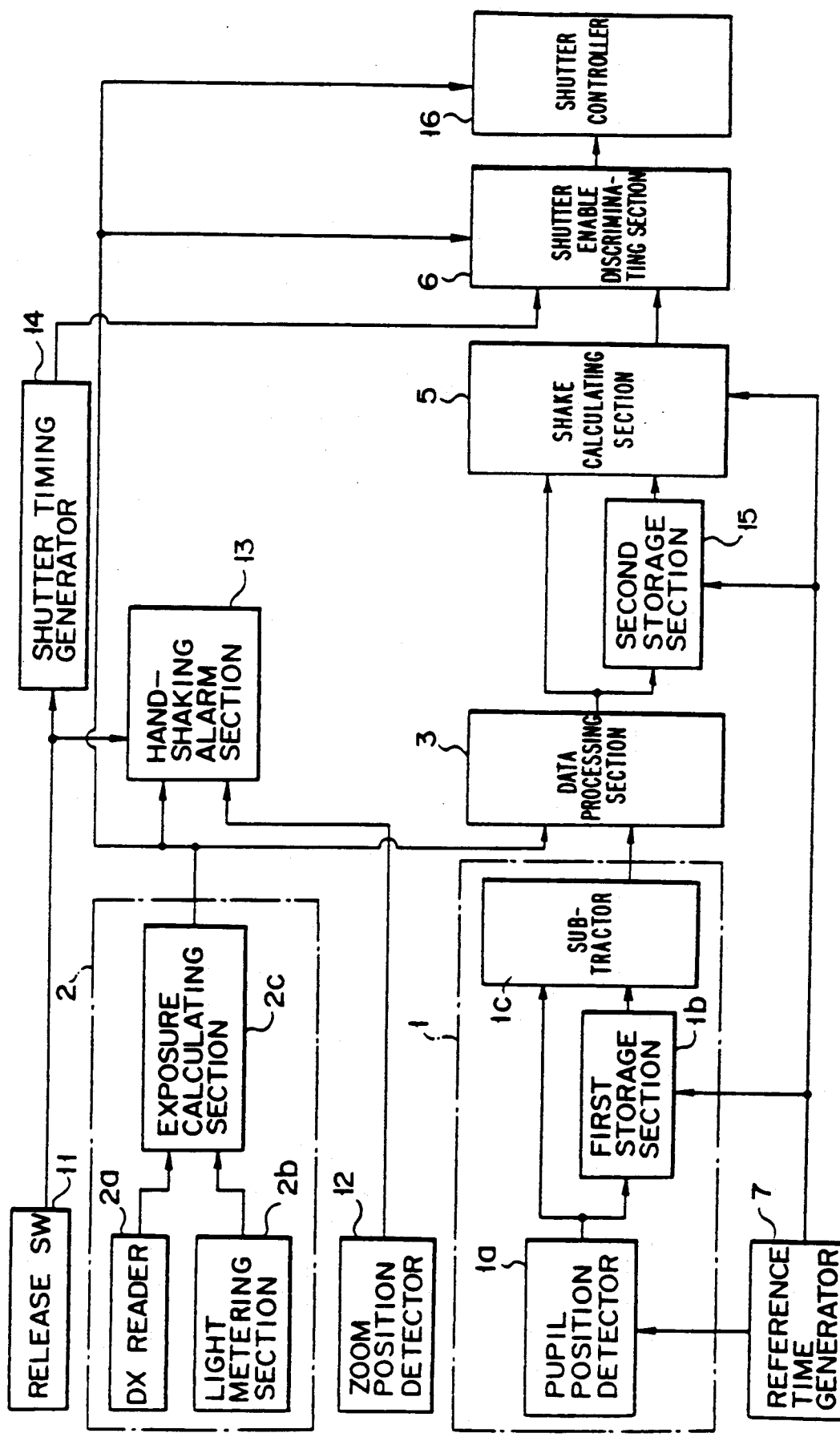
F I G. 5

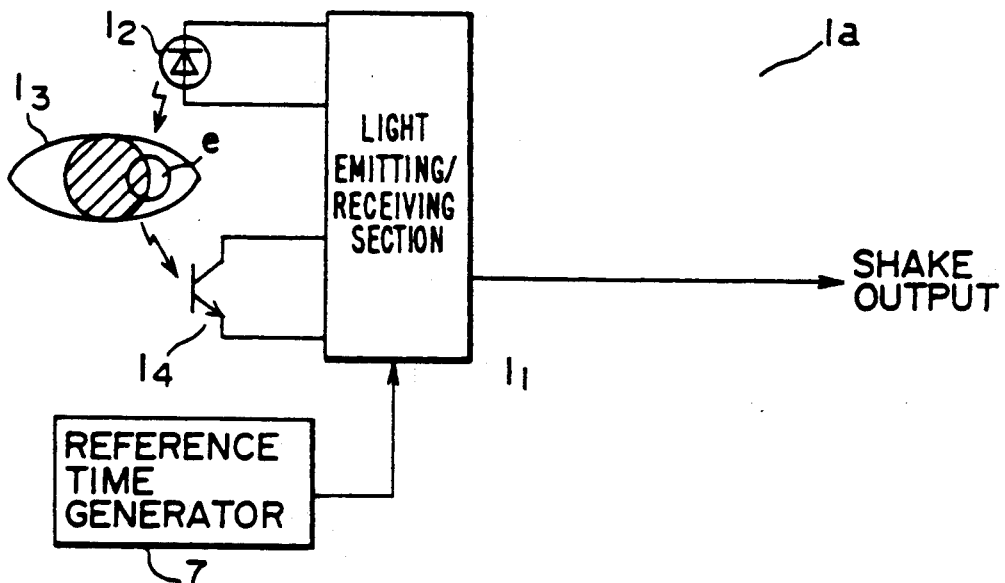
F I G. 6A
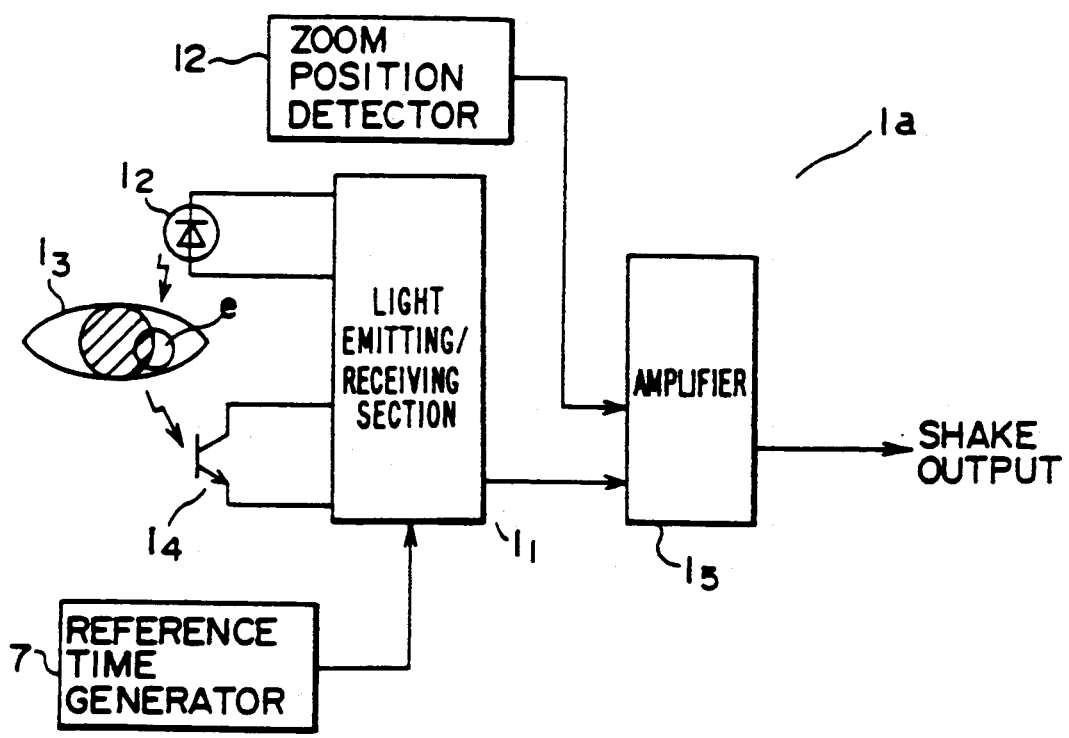
F I G. 6B

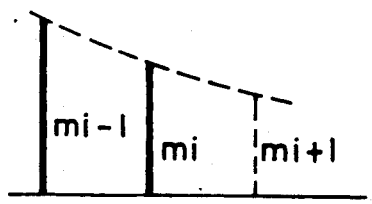
F I G. 9A
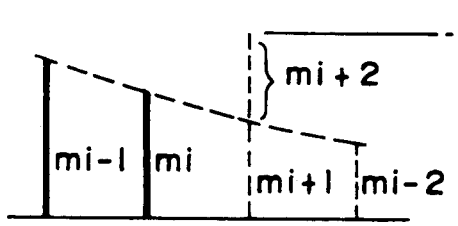
F I G. 9B
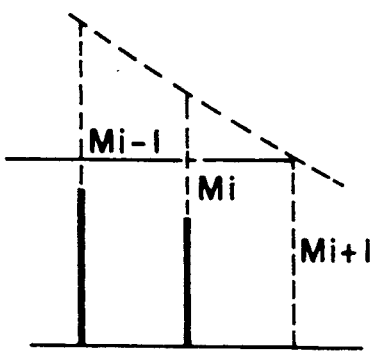
F I G. 9C
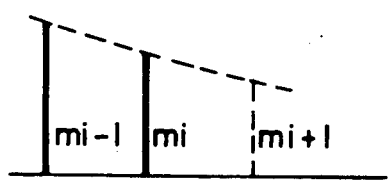
F I G. 9D
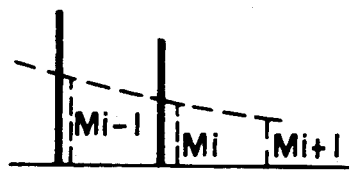
F I G. 9E
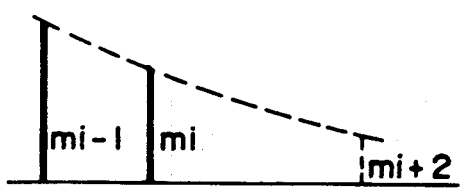
F I G. 9F

| CURRENT DATA / PREVIOUS DATA | NB | NM | NS | Z | PS | PM | PB |
|---|---|---|---|---|---|---|---|
| NB | BB | | | | | | |
| NM | | MB ① | Z ③ | | | | |
| NS | LB | B ② | S ④ | | B | | |
| Z | | | S | Z | MB | | |
| PS | | | MB | | M | B | LB |
| PM | | | | | Z | B | |
| PB | | | | | | M | BB |

FIG. 11

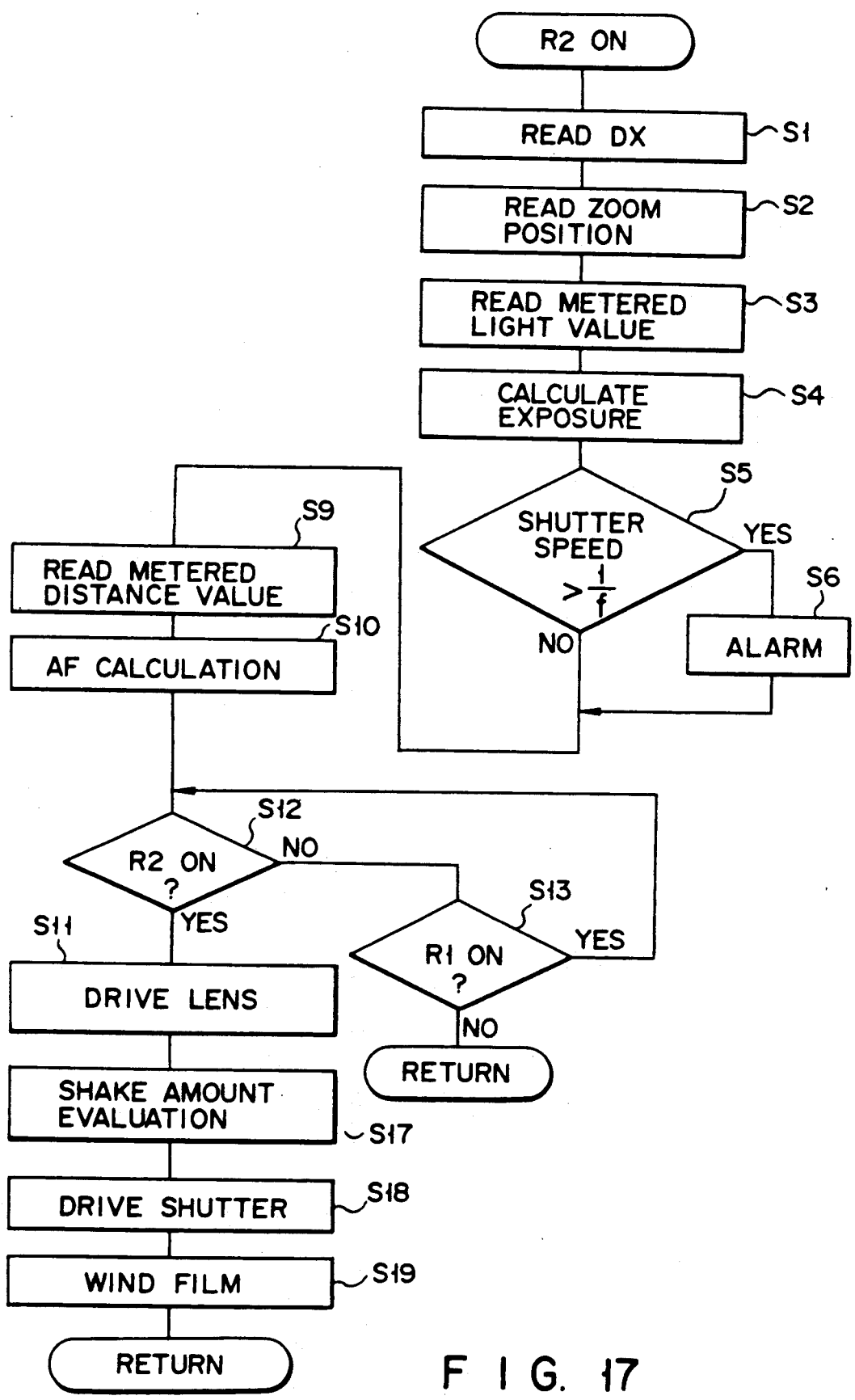
F I G. 17

| S | SK |
|---|---|
| $\frac{1}{1000}$ | $1/8$ |
| $\frac{1}{500}$ | $1/4$ |
| $\frac{1}{250}$ | $1/2$ |
| $\frac{1}{125}$ | 1 |
| $\frac{1}{60}$ | 2 |
| $\frac{1}{30}$ | 4 |

FIG. 19

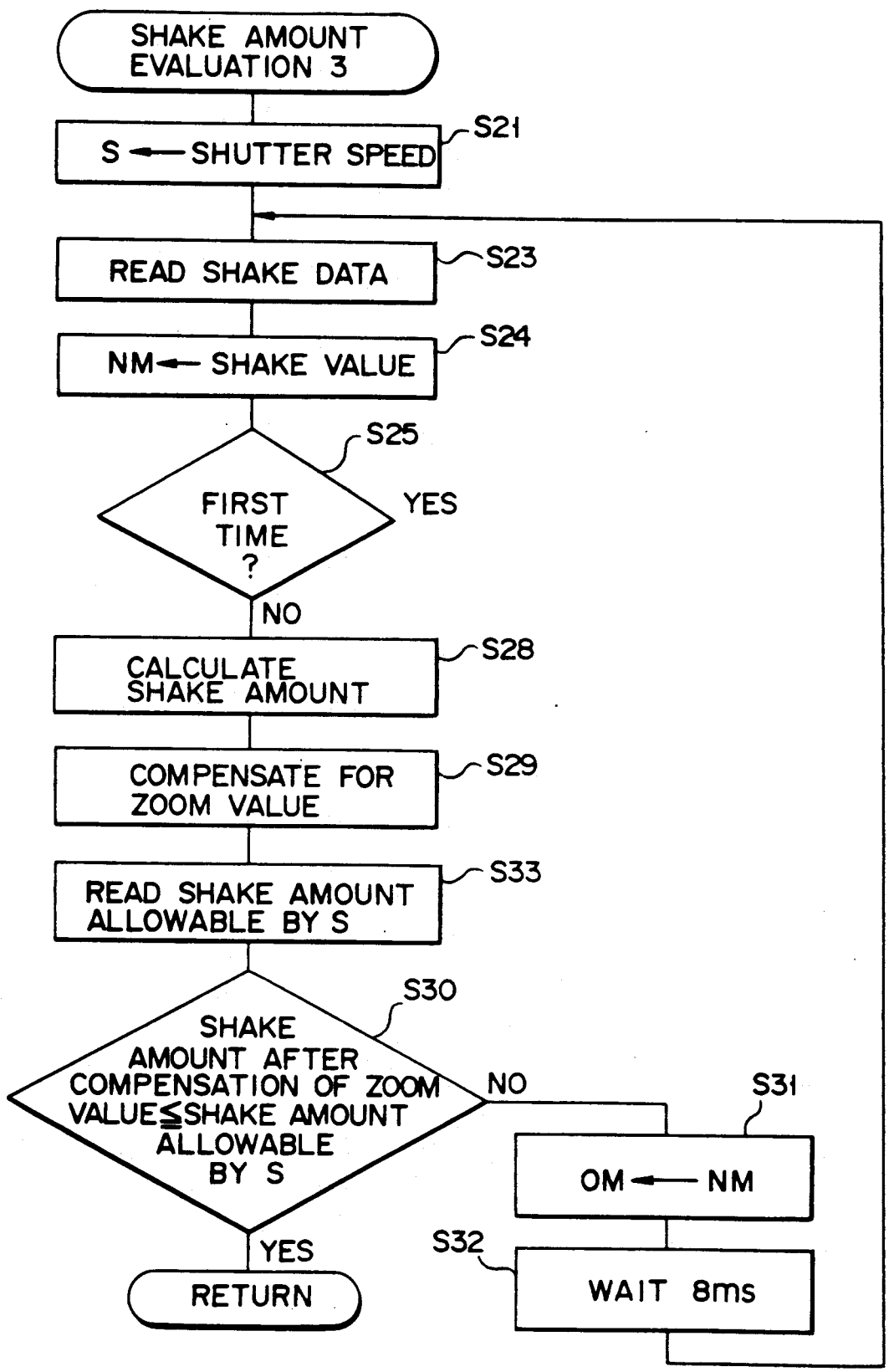
F I G. 21

| S | ALLOWABLE SHAKE AMOUNT μm |
|---|---|
| 1/500 | 80 |
| 1/250 | 40 |
| 1/125 | 20 |
| 1/60 | 10 |
| 1/30 | 5 |
| 1/15 | 2.5 |

F I G. 22

| S | ALLOWABLE SHAKE AMOUNT μm |
|---|---|
| 1/500 | 50 |
| 1/250 | 30 |
| 1/125 | 20 |
| 1/60 | 15 |
| 1/30 | 10 |
| 1/15 | 5 |

F I G. 23

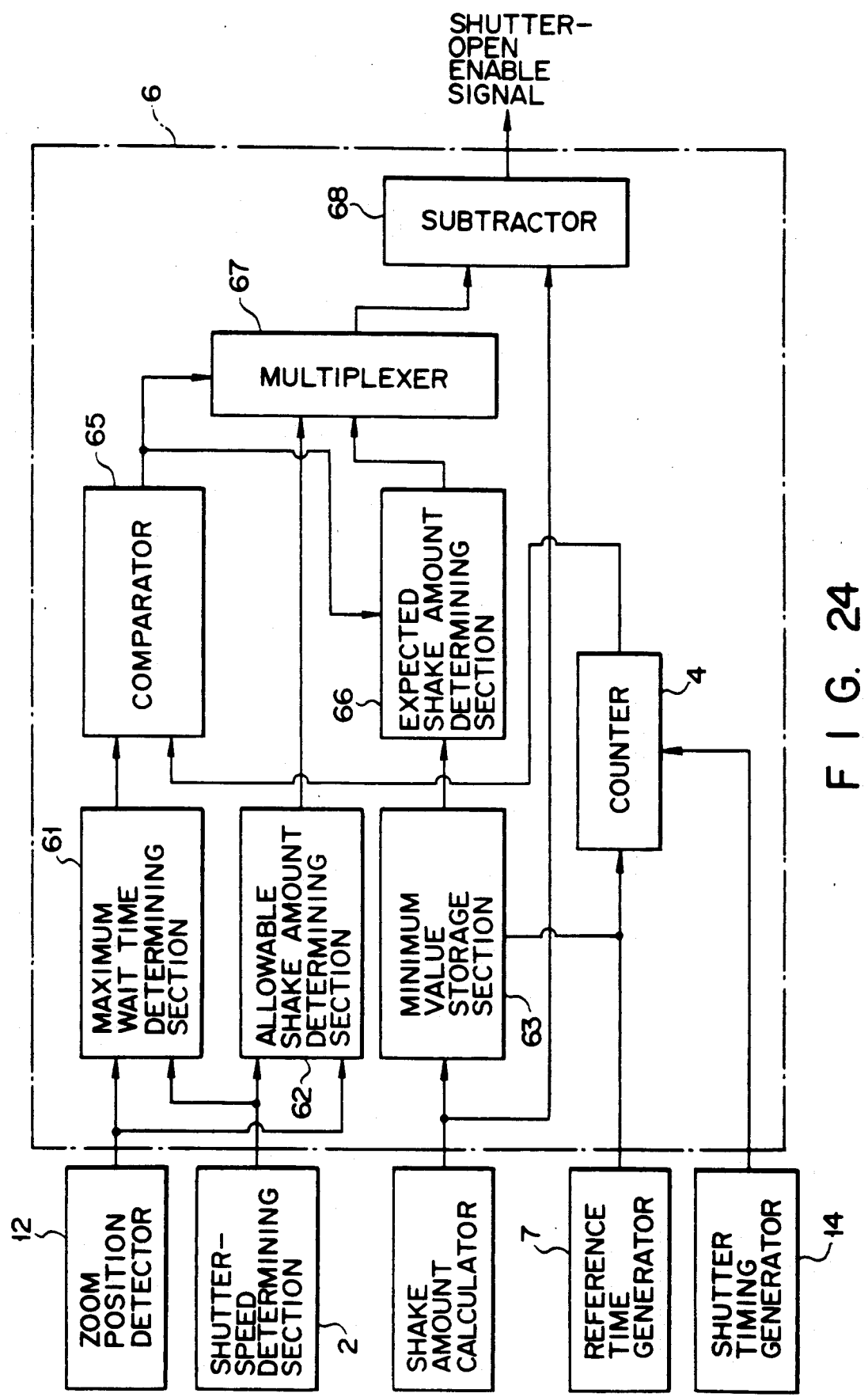
F I G. 24

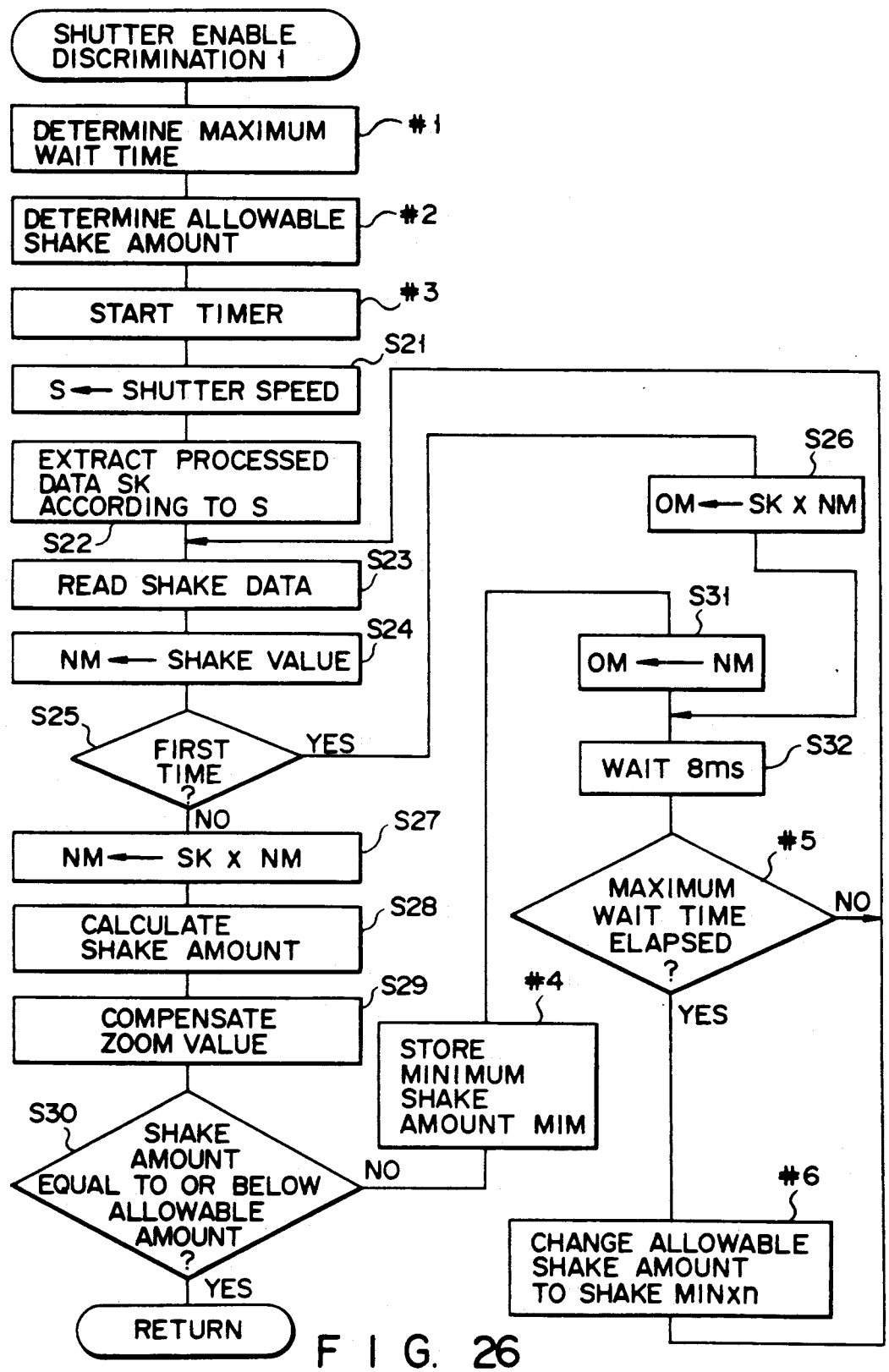
F I G. 26

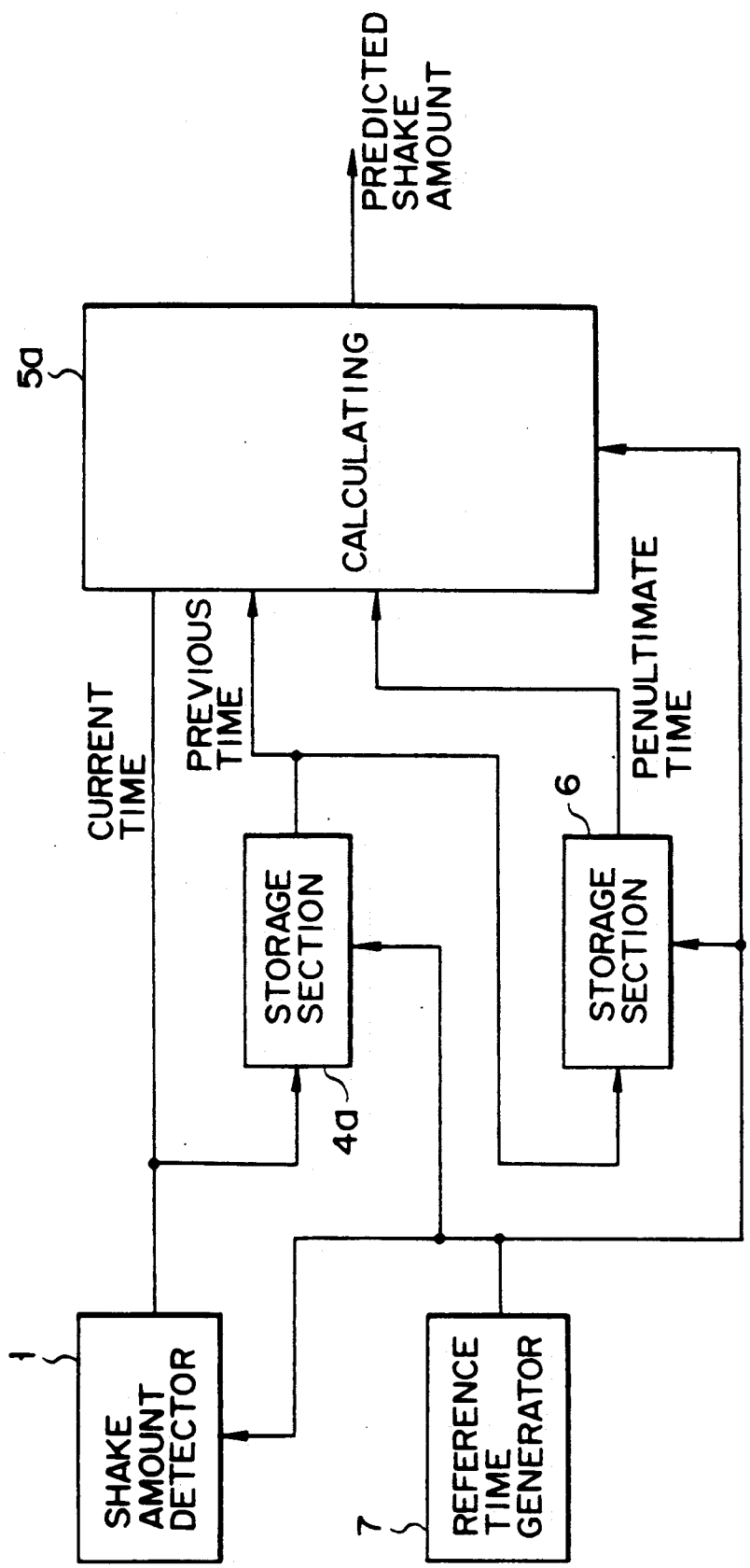
F I G. 28

EXPOSURE CONTROL APPARATUS FOR CAMERA WITH SHAKE COUNTERMEASURE

This application is a continuation of application Ser. No. 07/768,820, filed Sept. 30, 1991, abandoned.

BACKGROUND OF THE INVENTION

1. Field of the Invention

The present invention generally relates to a camera apparatus and, more particularly to an exposure control apparatus with shake countermeasure to easily reduce disturbance of hand shaking on an image to be picked up.

2. Description of the Related Art

There has been proposed a technique to permit a shutter release at the peak of hand shaking (where the camera displacement is smallest) in view of hand shaking considered as a simple harmonic motion, thereby minimizing the influence of the shaking of a hand holding a camera on an image to be picked up (hereinafter referred to as "pickup image").

As one example of such a technique, a technique of finding the peak of shaking using a phase shift filter is disclosed in Japanese Unexamined Patent Publication No. 63-53531.

Japanese Unexamined patent Publication No. 64-86122 discloses a technique of substituting a measured shake value into an equation for a simple harmonic motion to acquire a coefficient in order to detect the timing of the next peak of the shaking.

As discussed above, the prior art detects the peak shaking, considering the hand shaking as a simple harmonic motion.

Actually, however, hand shaking is not a simple harmonic motion, but more complicated movement, thus making approximation with simple harmonic motion difficult.

Further, unless there is a minimum measuring time for a half the period between peaks, the next peak cannot be detected, increasing a time lag for shutter release. That is, assuming the frequency of shaking is 2 Hz, the shortest time to detect the next peak is 0.5 sec after the beginning of the measuring.

SUMMARY OF THE INVENTION

It is therefore an object of the present invention to provide a new and improved exposure control apparatus for a camera with a shake countermeasure which can cope with a complicated shaking movement even with a simple structure, and can shorten a time lag involved in the detection of shaking, thereby minimizing the influence of the shaking on a pickup image.

According to one aspect of the present invention, there is provided an exposure control apparatus comprising shake amount detecting means for repeatedly detecting shaking of a camera in a sampling time interval shorter than a hand shaking cycle; exposure calculating means for calculating a shutter speed concerning an opening of a shutter of the camera based on a sensitivity of a film to be loaded in the camera and brightness information of an object to be picked up by the camera; data processing means for acquiring processed data from a product of the shutter speed calculated by the exposure calculating means and an amount of shaking detected by the shake amount detecting means every time the amount of shaking is detected by the shake amount detecting means; storage means for storing the processed data output from the data processing means; shake amount predicting means for receiving the processed data from the data processing means and the processed data stored in the storage means to predict a total amount of shaking while the shutter is open, every time the processed data is output from the data processing means; a release switch for preparing for beginning of an exposing operation on the film; shutter enable discriminating means for discriminating permission of shutter release when a latest predicted total amount of shaking during shutter opening, output from the shake amount predicting means, is equal to or smaller than a predetermined amount, every time the release switch is operated and the shake amount predicting means predicts the total amount of shaking; and shutter control means for starting opening the shutter based on a signal from the shutter enable discriminating means and controlling an exposure time based on the shutter speed calculated by the exposure calculating means.

With the above structure, an exposing operation can start in a shaking state that does not affect image pickup, making it possible to reduce the influence of shaking on a pickup image within an allowable range.

Additional objects and advantages of the invention will be set forth in the description which follows, and in part will be obvious from the description, or may be learned by practice of the invention. The objects and advantages of the invention ma be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a diagram illustrating the basic structure of an exposure control apparatus for a camera according to one embodiment of the present invention;

FIG. 4 is a diagram showing an example of shaking as a displacement in one direction for the sake of convenience;

FIG. 5 is a detailed block diagram of the structure in FIG. 1;

FIGS. 6A and 6B are diagrams exemplifying a pupil position detector;

FIGS. 9A to 9F are diagrams illustrating specific examples of acquiring the predicted amount of shaking;

FIG. 11 is a diagram exemplifying prediction rules by the MIN-MAX-center-of-gravity method in the case where a predicted amount of shaking is acquired using a fuzzy prediction;

FIG. 17 is a flowchart illustrating a release sequence of a lens shutter camera;

FIG. 19 is a diagram showing a ROM table for a variable S of the shutter speed and processed data SK;

FIG. 21 is a flowchart illustrating a third embodiment of evaluation of the amount of shaking;

FIG. 22 is a diagram of a simple table showing the relationship between the shutter speed and the allowable amount of shaking;

FIG. 23 is a diagram of a table showing the relationship between the shutter speed and the allowable amount of shaking, the latter varying gently with a change in the former;

FIG. 24 is a block diagram illustrating another structure of a shutter enable discriminating section;

FIG. 26 is a flowchart in the case where the structure in FIG. 24 is realized using a CPU;

FIG. 28 is a structural diagram of essential portions illustrating an embodiment to predict the amount of shaking based on three inputs by a fuzzy prediction.

DETAILED DESCRIPTION OF THE PREFERRED EMBODIMENTS

Figure 2A:
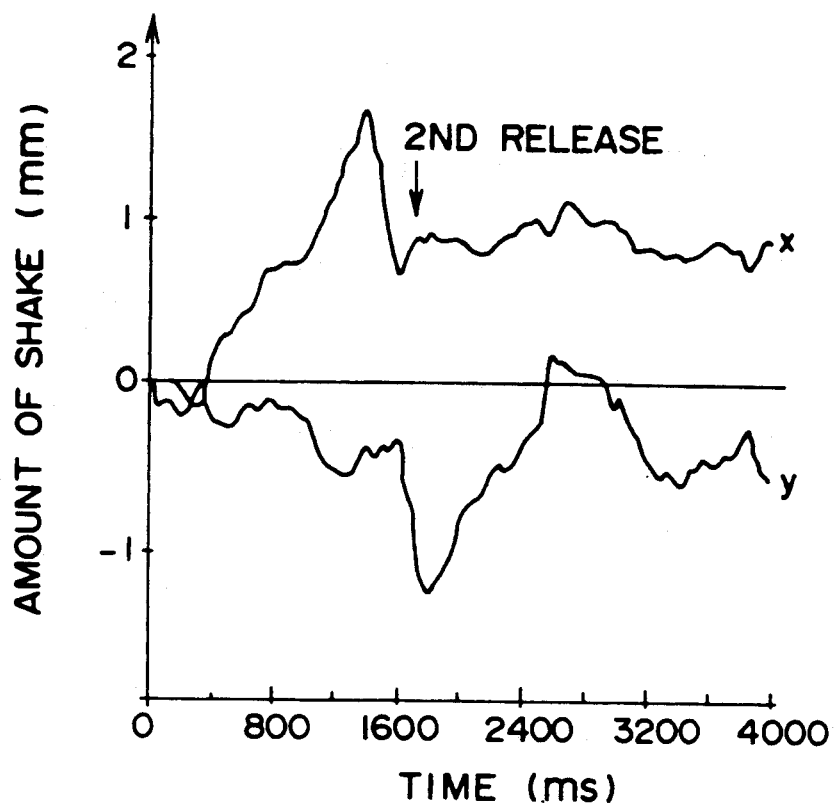
FIGS. 2A and 2B are monitor waveform diagrams in case of bad shaking.

The first preferred embodiment of the present invention will now be described referring to the accompanying drawings.

FIG. 1 illustrates the basic conception of an exposure control apparatus for a camera according to the present invention.

The exposure control apparatus comprises a shake amount detecting section 1, a shutter-speed determining section 2, a data processing section 3, a storage section 4, a shake amount calculating section 5, a shutter enable discriminating section 6 and a reference time generator 7. The shake amount detecting section 1 detects the amount of shaking caused by hand-shaking of a user. The shutter-speed determining section 2 determines the shutter speed (exposure time) from the result of metering light, or the like. The data processing section 3 processes the amount of shaking detected by the shake amount detecting section 1 based on the shutter speed determined by the shutter-speed determining section 2.

The storage section 4 stores shake data (shake compensation value) processed in the data processing section 3. The shake amount calculating section 5 predicts the total amount of shaking during opening a shutter-open period, based on the current shake data and the previous shake data stored in the storage section 4. The shutter enable discriminating section 6 discriminates if the shutter should be opened, based on the amount of shaking predicted by the shake amount calculating section 5 and the shutter speed by the shutter-speed determining section 2. The reference time generator 7 controls the operation timings of the shake amount determining section 1, the storage section 4 and the shake amount calculating section 5.

The exposure control apparatus for a camera is designed to predict the total amount of shaking during exposure based on the current and previous shake data acquired by processing the amount of shaking with the shutter speed, and to permit the shutter to open in association with the shutter speed if the amount of shaking is allowable, and does not affect an image to be picked up.

The shaking will now be described with a specific example, hand shaking.

FIGS. 2A and 2B, and 3A and 3B show typical examples when actual hand shaking is monitored.

The actual amount of shaking on the surface of a film is shown in each graph with the focus distance f of a lens as 100 mm.

Figure 2B:
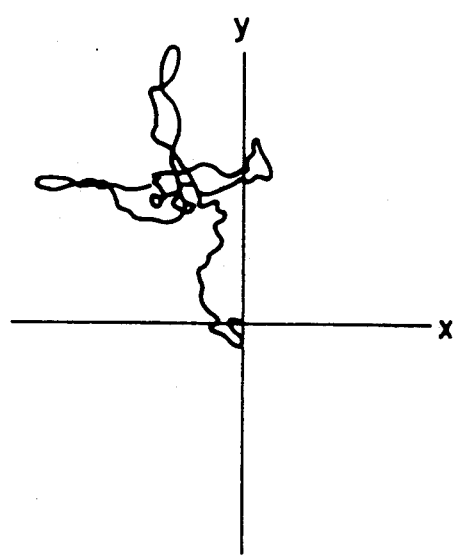

FIGS. 2A and 2B each exemplify a relatively large amount of shaking. FIG. 2A shows a shake in x and y directions to the time axis, while FIG. 2B shows the locus of the shake on the x-y plane.

Figure 3A:
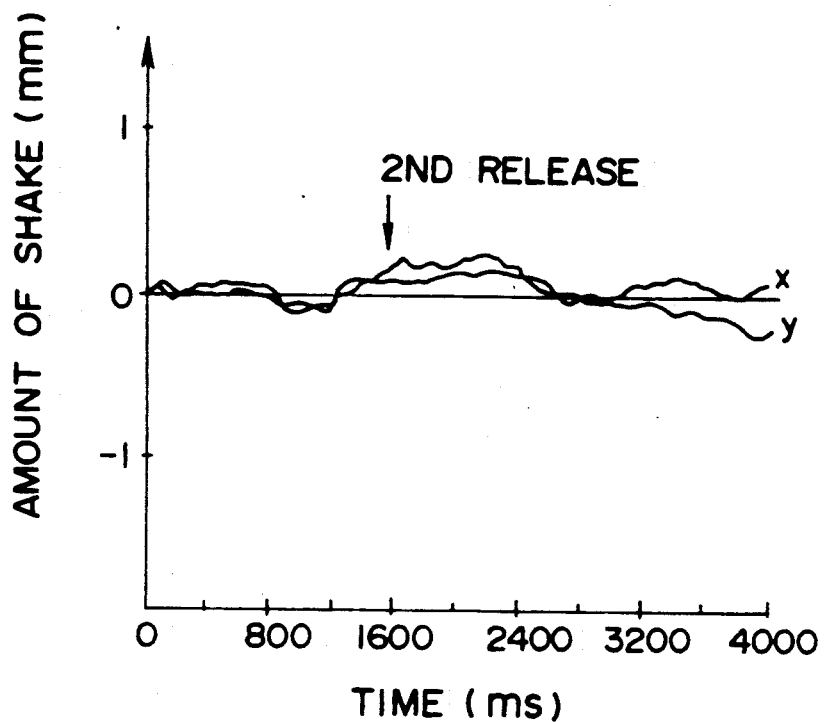
FIGS. 3A and 3B are monitor waveform diagrams in case of little shaking.
Figure 3B:
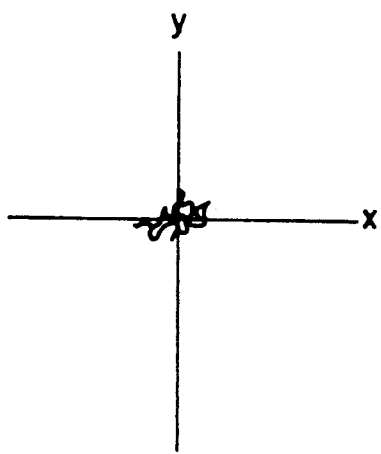

FIGS. 3A and 3B each exemplify a small amount of shaking by a careful shutter release. Like FIGS. 2A and 2B, FIG. 3A shows a shake in x and y directions to the time axis, while FIG. 3B shows the locus of the shake on the x-y plane.

As apparent from these graphs which simply represent examples, there is no regular change but a random movement (irregular change) in hand shaking. It is therefore obvious that the shaking cannot be approximated by a simple harmonic motion.

FIG. 4 is a diagram showing an example of shaking as a displacement in one direction for the sake of convenience. A description will be given of one way to reduce the influence of a shake on a pickup image, referring to FIG. 4.

With the shutter speed of 1/125, the opening time of the shutter is 8 ms. Assuming that an allowable amount of shaking is 30 $\mu$m, it is understood that the shutter can be released at any timing. In other words, since the change in shake does not exceed 30 $\mu$m while the shutter is to open, the shutter can be released at any timing.

With the shutter speed set to 1/30, however, the shutter opening time is about 33 ms. During this time, the shake change is smaller than 30 $\mu$m in the ranges $A_1$ and $A_2$, for example. The shutter release timing is therefore limited.

Likewise, with the shutter speed of 1/60, the shutter can be released in a wider range than $A_1$ and $A_2$. With the shutter speed of 1/15, the range for the shutter release is narrower, so that the shake change may never become smaller than 30 $\mu$m, i.e., the shutter release timing may never come.

It is therefore apparent that the timing for opening the shutter should be decided in association with the shutter speed, and that the shutter can be released in a range, such as $A_1$, where the shake change is relatively stable without even waiting for the peak of the shake to come in order to reduce the influence by the shake.

When the shutter speed is high, of course, the shutter can be released at a point where the change in shake is relatively large.

The first embodiment will be further described in detail, with this theory as the premise.

In FIG. 5, the shake amount detecting section 1 includes a pupil position detector 1a, a first storage section 1b and a subtracter 1c. The pupil position detector 1a detects, for example, the position of the pupil in accordance with a timing signal from the reference time generator 7 to be described later, and calculates a relative position from a camera. The first storage section 1b stores the detection output of the pupil position (shake output) from the pupil position detector 1a in synchronism with the timing signal. The subtracter 1c calculates the difference between the previous shake output stored in the first storage section 1b and the current shake output from the pupil position detector 1a, i.e., acquires the amount of shaking, m.

The shutter-speed determining section 2 includes a light metering section 2b which meters lights, and an exposure calculating section 2c which calculates exposure based on the DX code from the DX reader 2a and a metered light value from the light metering section 2b to determine a shutter speed S.

A release switch SW11 outputs the first (1st) release signal by half depression, and the second (2nd) release signal by full depression.

A zoom position detector 12 detects a focus distance f for a zoom lens.

A hand-shaking alarm section 13 determines if hand shaking has occurred, based on the shutter speed S from the shutter-speed determining section 2 and the focus distance f detected by the zoom position detector 12, and informs the user of the judgment at the timing when the 1st release signal is sent from the release SW11. If the shutter speed S is greater than 1/f, the reciprocal of the focus distance f (1/f<S), the hand-shaking alarm section 13 normally generates a tone or lights a light-emitting diode in a finder to instruct a careful shutter release.

A shutter timing generator 14 receives the 2nd release signal from the release SW11, and generates a shutter-open signal in the normal sequence which does not considerate the hand shaking.

Based on the amount of shaking, m, from the shake amount detector 1 and the shutter speed S from the shutter speed determining section 2, the data processing section 3 calculates "m×S/Δt." The amount of shaking per unit time is compensated for based on the exposing period, so that the data is processed. "Δt" in the above formula expresses an interval where the timing signal is output, i.e., a sampling period.

The second storage section 15, corresponding to the storage section 4 in FIG. 1, stores shake data which is processed by the data processing section 3 in synchronism with the timing signal.

In synchronism with the timing signal, the shake amount calculation section 5 predicts the total amount of shaking while the shutter is open, based on the previous shake data stored in the second storage section 15 and the current shake data from the data processing section 3.

Upon reception of a shutter-open signal from the shutter timing generator 14, the shutter enable discriminating section 6 evaluates the predicted amount of shaking in association with the shutter speed S determined by the shutter-speed determining section 2, and delays the shutter-opening timing until the predicted amount of shaking decreases to an allowable range where the influence of the hand shaking is allowable.

A shutter controller 16 receives a shutter-opening enable signal from the shutter enable discriminating section 6, and controls opening of the shutter in accordance with the shutter speed S from the shutter-speed determining section 2.

The reference time generator 7 outputs a timing signal for every predetermined sampling time (Δt), and controls the operation timings of the pupil position detector 1a, the first storage section 1b, the shake amount calculating section 5 and the second storage section 15.

FIGS. 6A and 6B exemplify the structure of the pupil position detector 1a.

In FIG. 6A, a light emitting/receiving section $1_1$ emits low infrared light from a light-emitting diode $1_2$ connected to the section $1_1$ to an eyeball $1_3$, and at the same time receives reflection light from a light-reception range e via a phototransistor $1_4$. The light emitting-/receiving section $1_1$ therefore detects the position of the pupil in synchronism with the timing signal from the reference time generator 7. When the phototransistor $1_4$ receives the light, the intensity of the light vary in accordance with the ratio of the pupil to the white of the eye. Thus, the light emitting/receiving section 11 can easily detect the position of the pupil (shake output).

FIG. 6B shows another example of the structure of the pupil position detector 1a. In this example, based on the output from the light emitting/receiving section $1_1$ and the focus distance f detected by the zoom position detector 12, a value corresponding to the actual shake on the surface of a film (shake output) is obtained from an amplifier $1_5$.

Even if the body or the head of a photographer moves a little, his or her eye is normally fixed upon the target during the exposure. The position of the eye is therefore available as the absolute position to the target. In other words, if a sensor which detects the position of the pupil is provided in proximity to the viewfinder of a camera, the output from the sensor can be used as shaking position data.

Since a position indicated as a light receiving spot e on the eyeball 13 is detected in this case, it is possible to detect all shifting components in the x and y directions even from a single detection position. The accuracy of the detection can be improved by increasing detection positions.

According to this embodiment, the light emitting diode and the phototransistor have been used to acquire the shake output. As the sensor which detects shaking, an AF (automatic focusing) sensor utilizing an acceleration sensor or a CCD (charge-coupled device) is available.

A technique to calculate the predicted amount of shaking will now be described.

Figure 7:
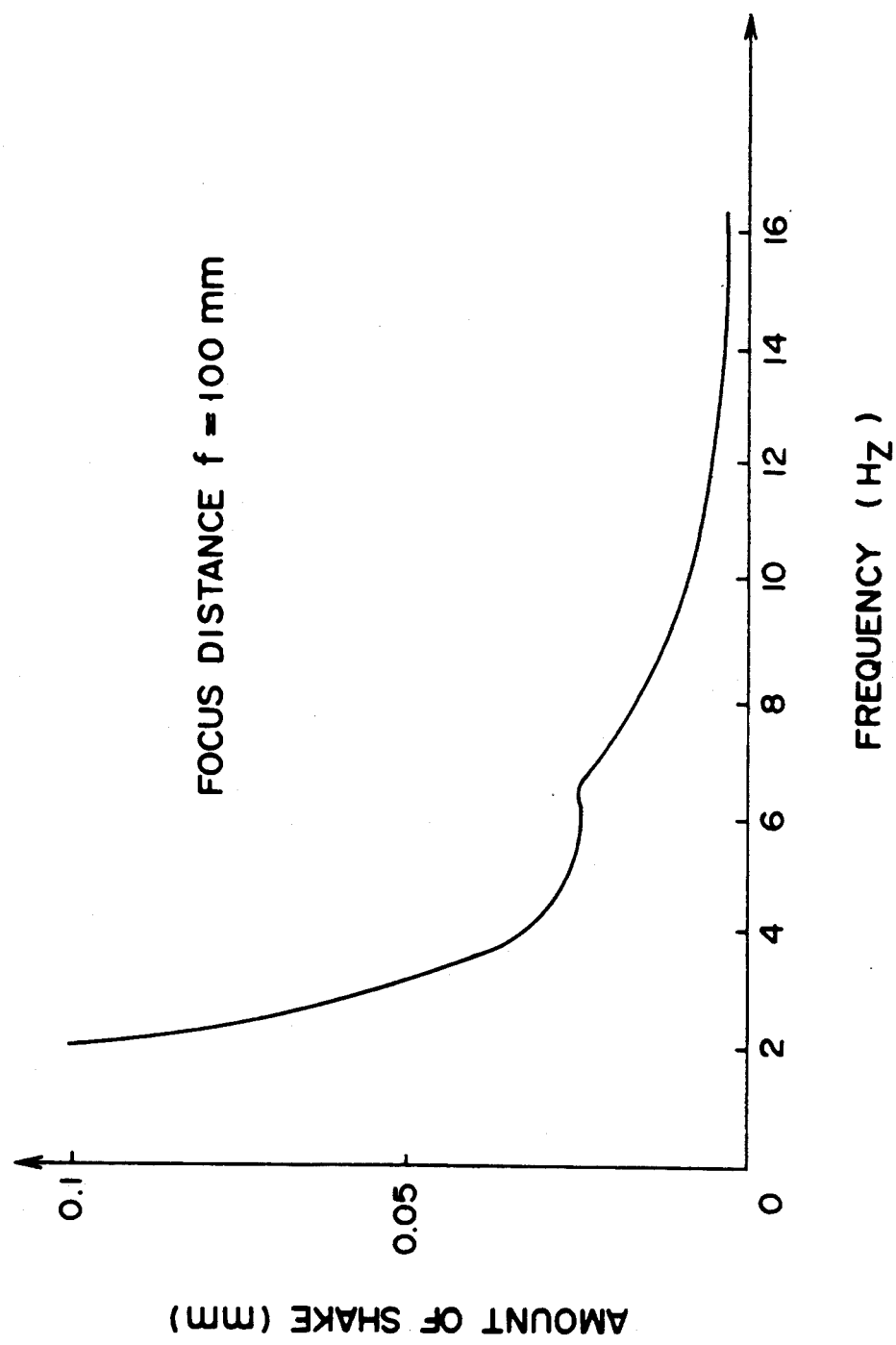
FIG. 7 is a diagram illustrating the result of analysis of the frequency component of shaking based on the amount of shaking.

FIG. 7 illustrates the result of analysis of the frequency component of shaking based on the amount of shaking, when a zoom lens with the focus distance f of about 100 mm is used.

As apparent from the graph, the frequency components of shaking are mostly of several Hz. It may be considered that the amount of shaking becomes large with the shake frequency of about 4 Hz or lower. The amount of shaking does not increase much with the shake frequency greater than 4 Hz.

The waveform of shaking is not that of a simple harmonic motion; however, in consideration of the waveform of the simple harmonic motion as being influential on shaking, this shaking waveform may be considered as a combination of parts of the waveform of simple harmonic motion of several Hz or below. This is because that the waveform of shaking with a high frequency does not have very large amplitude, and can be neglected. If the amount of shaking is predicted on the assumption that the amplitude of the shaking waveform with the frequency in question is greater than the actual one, the actual amount of shaking is usually less than the predicted amount.

Figure 8:
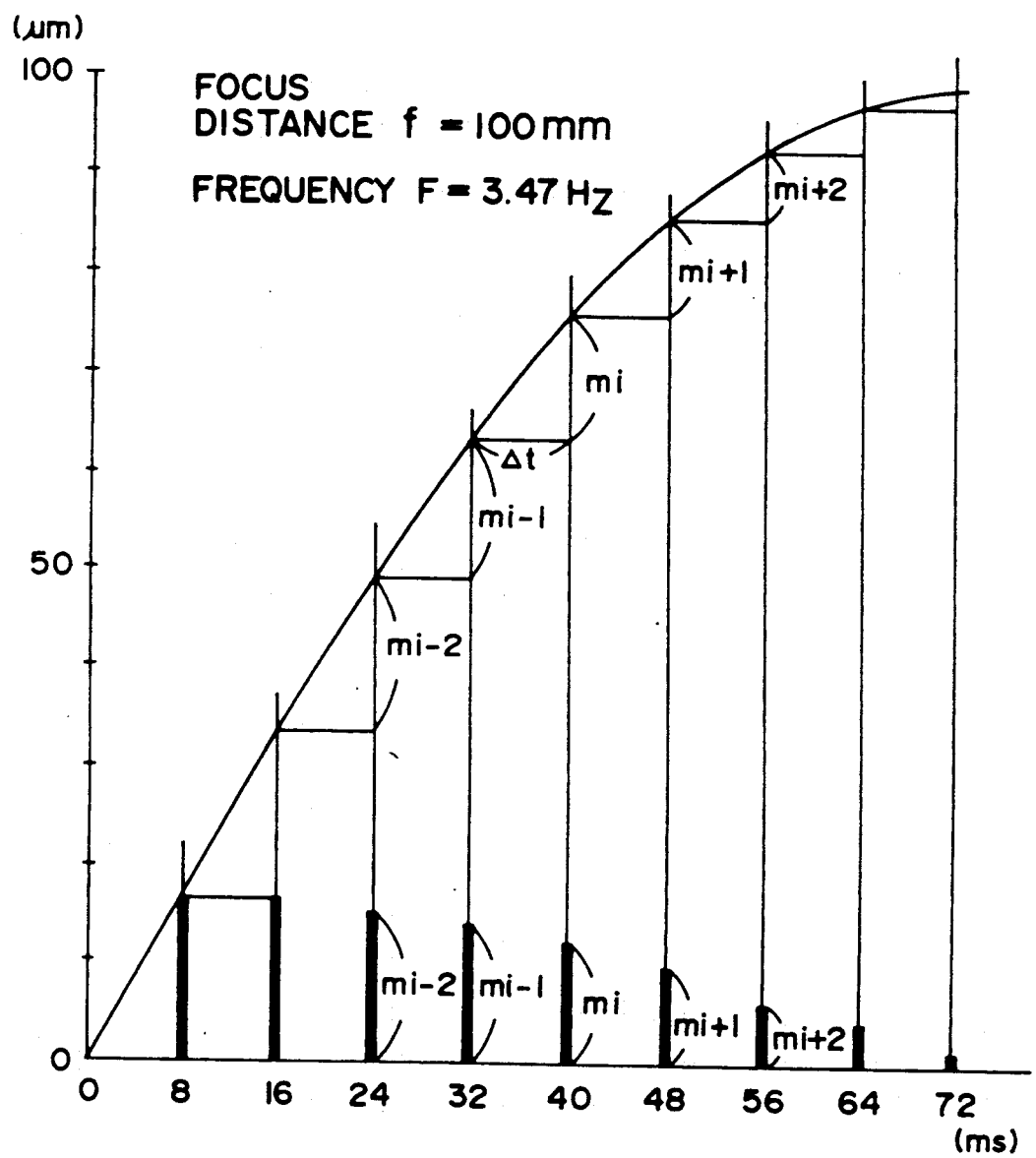
FIG. 8 is a waveform diagram of a shaking output shown for explaining the computation to acquire a predicted amount of shaking.

FIG. 8 illustrates the waveform of a considerably large shake output when the frequency F is about 3.5 Hz and the lens with its focus distance f of 100 mm is used. In FIG. 8, $\Delta t$ is an interval in which the timing signal is output (sampling time), and is set to 8 ms.

"mi," the amount of shaking at the ith time, is defined as a shake change on a unit film surface. In other words, "mi−1" is the amount of shaking one sampling time older than the ith one, and "mi−2" is the amount of shaking two sampling times older than the ith one. "mi+1" is the next amount of shaking after the ith sampling time, and "mi+2" is the amount of shaking at the second sampling time after the ith one.

The frequency of several Hz or below affects the amount of shaking. If the amount of shaking is metered with a much faster sampling time (8 ms in this case) than several Hz, therefore, the next amount of shaking when linearly approximated or approximated as the waveform of a simple harmonic motion of a large amount of shaking with a high frequency among those in question (3.5 Hz in this case) would not differ so much from the actual amount of shaking.

FIGS. 9A to 9F are diagrams illustrating specific examples of acquiring the predicted amount of shaking.

In the following description, the current amount of shaking is assumed to be the ith amount of shaking.

FIG. 9A shows the case of the shutter speed S of 1/125. Since S=1/125=8 ms in this case, $\Delta t = S$. from the previous amount of shaking, mi−1, and the current amount of shaking, mi, is represented by the broken line in the diagram.

From the relation $\Delta t = S$, the predicted amount of shaking is what is indicated by mi+1.

FIG. 9B shows the case where the shutter speed S is 1/60. In this case, since S=16 ms, S=2$\Delta t$. Normally, therefore, (mi+1)+(mi+2) is acquired as the predicted amount of shaking from the next amount of shaking, mi+1, and the next amount of shaking after that, mi+2.

Assuming that the data processing section performs the operation of m×S/$\Delta t$, however, the individual amounts of shaking would be processed as shown in FIG. 9C. As m×S/$\Delta t$=m 16/8=2 m, and expressing the current amount of shaking and the previous amount of shaking as 2mi=Mi and 2mi−1=Mi−1, respectively, Mi+1 can be predicted from these data Mi and Mi-1. This total amount of shaking Mi+1 is almost equal to the predicted amount of shaking, (mi+1)+(mi+2), in FIG. 9B.

When the amount of shaking, m, is processed using the equation m×S/$\Delta t$, the prediction can be done easily.

FIG. 9D shows the case where the shutter speed S is 1/250. Since S=4 ms yields S=½$\Delta t$, the total amount of shaking, Mi+1, to be acquired is a half of the predicted amount of shaking, mi+1, after 8 ms.

FIG. 9E shows the result of predicting the total amount of shaking, Mi+1, using the aforementioned equation.

If prediction is made by processing the amount of shaking, m, or the output of the shake amount detecting section 1, the total amount of shaking, Mi+1, can be acquired irrespective of the sampling time $\Delta t$ as explained above. In other words, processing the amount of shaking facilitates the prediction of the amount of shaking regardless of the shutter speed S.

The foregoing description has been given on the assumption that there is no time lag from the point at which the opening of the shutter is enabled and to the point at which the shutter actually opens. Actually, however, there exists a time lag.

FIG. 9F shows the case where a time lag from the point at which the opening of the shutter is enabled and to the point at which the shutter actually opens and the shutter speed S is 1/125.

As is obvious from this diagram, with a time lag of 8 ms, the amount of shaking at the second sampling time after the current sampling time, mi+2, has only to be predicted.

In the case of a different shutter speed S (other than 1/125), likewise, the amount of shaking can of course be predicted easily.

With the time lag of other than 8 ms, prediction according to that time has only to be made, so that the present invention can be applied irrespective of the length of the time lag.

A description will now be given of the case where the predicted amount of shaking is acquired using a fuzzy prediction.

Figure 10A:
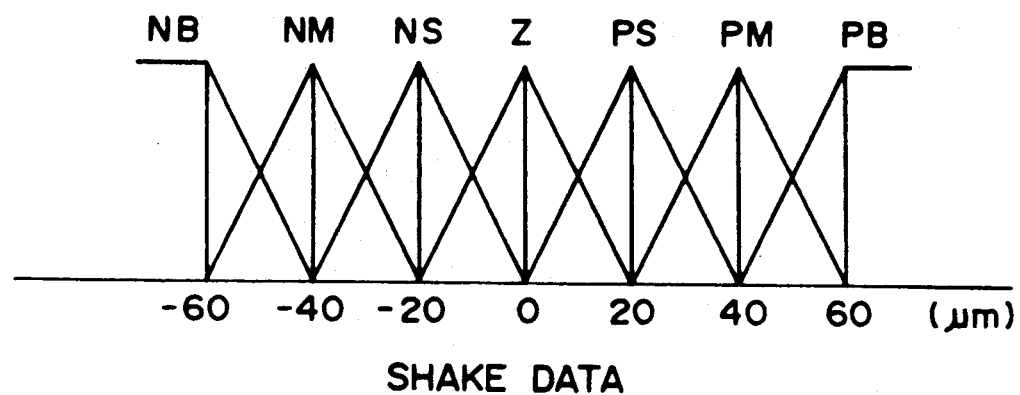
FIGS. 10A and 10B are diagrams illustrating examples of a membership function for acquiring a predicted amount of shaking using a fuzzy prediction.
Figure 10B:
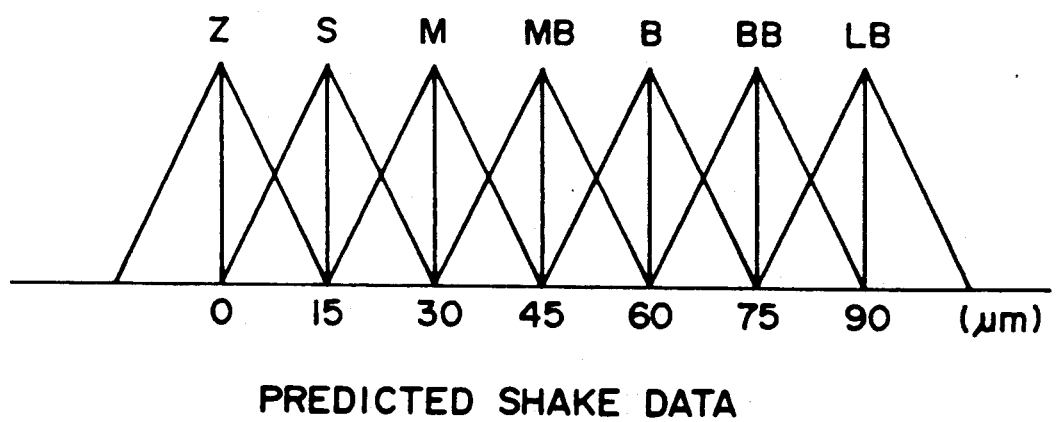

Since shaking has no regularity in shaking, as described above, the fuzzy prediction is suitable as a technique of predicting the total amount of shaking FIGS. 10A and 10B are diagrams illustrating examples of a membership function.

FIG. 10A shows membership functions for the "if" part, with shake data represented on the horizontal scale. The unit may be the output voltage of the shaking sensor.

In the diagram, "NB" (negative big), "NM" (negative medium), "NS" (negative small), "Z" (zero), "PS" (positive small), "PM" (positive medium), and "PB" (positive big) are labels of the respective membership functions.

FIG. 10B shows membership functions for the "then" part, with the predicted amount of shaking taken on the horizontal scale. In the diagram, "Z" (zero), "S" (small), "M" (medium), "MB" (medium big), "B" (big), "BB" (big big), and "LB" (large big) are likewise labels of the respective membership functions.

FIG. 11 is a diagram exemplifying prediction rules by the MIN-MAX-center-of-gravity method.

Here, as the simplest example, the rules are prepared with the time lag from the point at which the shutter-open enable signal is output to the point at which opening the shutter actually starts being set to "0" as shown in FIGS. 9A to 9E, which have been described. Actually, it is necessary to prepare rules in consideration of the tile lag.

In some of the rules, for example, if the previous shake data is NM and the current shake data is NM, the predicted amount of shaking is MB (case 1), if the previous shake data is NS and the current shake data is NM, the predicted amount of shaking is B (case 2), if the previous shake data is NM and the current shake data is NS, the predicted amount of shaking is Z (case 3), and if the previous shake data is NS and the current shake data is NS, the predicted amount of shaking is S (case 4).

The other rules are prepared in a similar manner, with blanks in FIG. 11 indicating where there are no rules.

The rules are not limited to what is shown in FIG. 11, but other rules may also be prepared.

When the previous shake data is 35 μm and the current shake data is 22 μm, for example, the rules of the cases 1 to 4 are used. The other rules are not used because the previous shake data and the current shake data do not included in any membership function.

Figure 12:
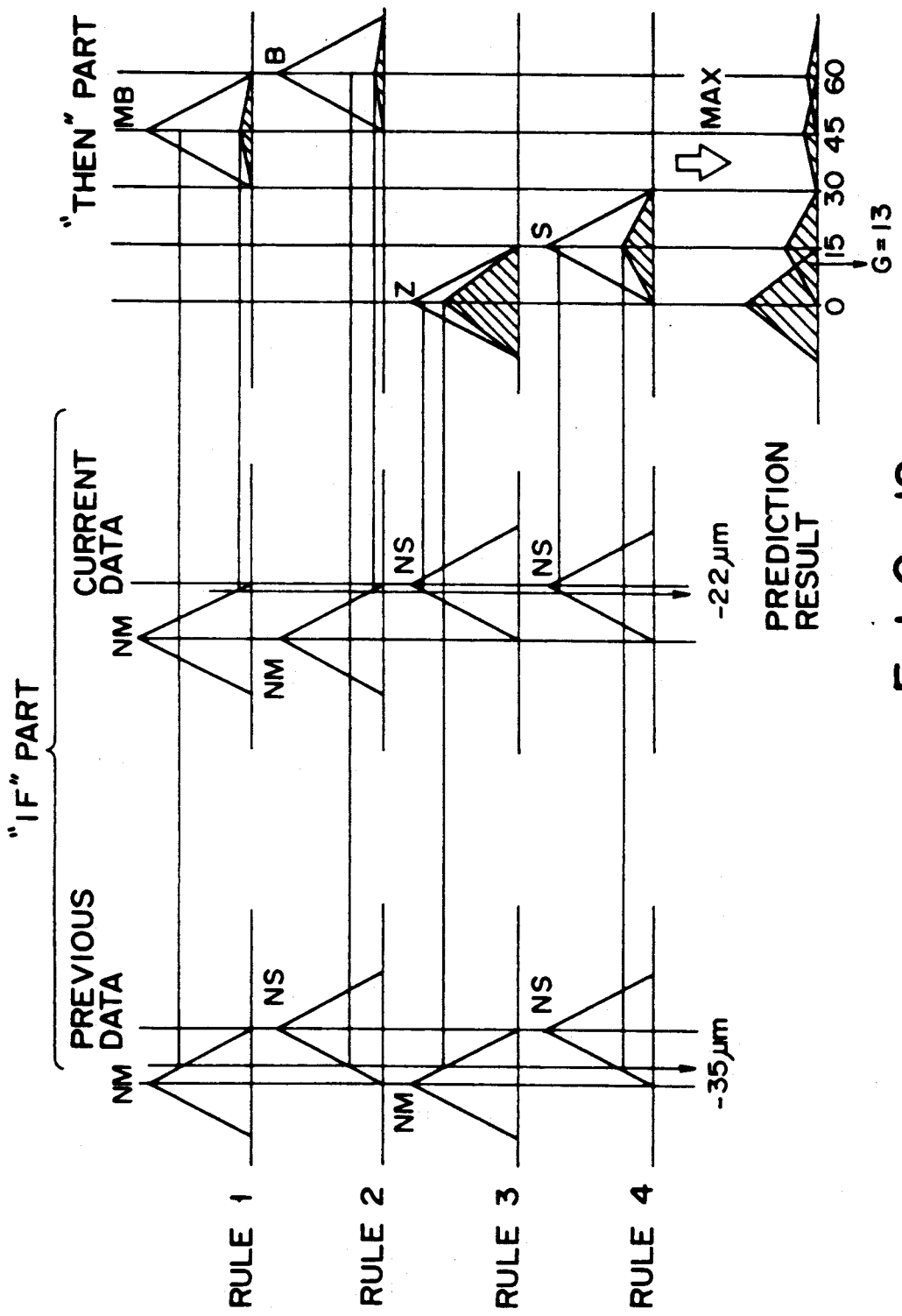
FIG. 12 is a diagram showing prediction procedures in the case where a predicted amount of shaking is acquired using a fuzzy prediction.

Referring now to FIG. 12, prediction procedures will be described with the aforementioned shake data as inputs.

In this case, the rules 1 to 4 respectively correspond to those of the cases 1 to 4. That is, in the rules 1 to 4, $-35$ is input as the previous data and $-22$ is input as the current data.

The membership function of the "then" part in each of the rules 1 to 4 is compressed by data of the cross point between the previous data or the current data and the membership function, whichever is smaller (MIN prediction).

Subsequently, the compressed membership functions of the "then" part are synthesized to provide the result of the prediction (MAX prediction).

Then, the center of gravity G of the prediction result is 13 μm, which is used as the predicted amount of shaking.

According to the fuzzy prediction, the predicted amount of shaking can easily be obtained in this manner.

The fuzzy prediction can of course be realized by either hardware or software.

The method of acquiring the predicted amount of shaking is not limited to the above-described fuzzy prediction, but a linear approximation may also be used to simply acquire it.

Figure 13:
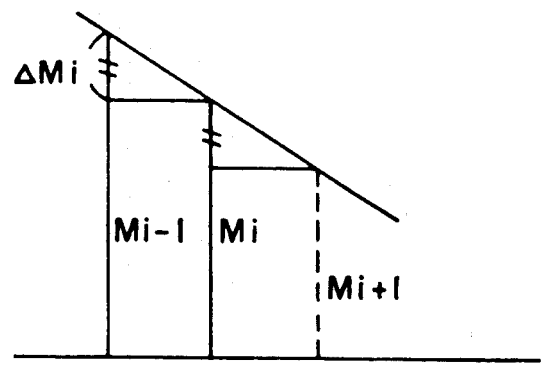
FIG. 13 is a diagram for explaining how to acquire a predicted amount of shaking by linear approximation.

FIG. 13 illustrates how to acquire the predicted amount of shaking through linear approximation, taking the case shown in FIG. 9C as an example.

More specifically, given $Mi - Mi - 1 = \Delta Mi$, the predicted amount of shaking can easily be obtained from $Mi + 1 = Mi + \Delta Mi$, where $\Delta Mi$ is with the sign "$\pm$."

When a high precision is not required in the result of the prediction, this method involving the linear approximation may be used.

Now, a description of the shutter enable discriminating section 6 will be given.

Figure 14:
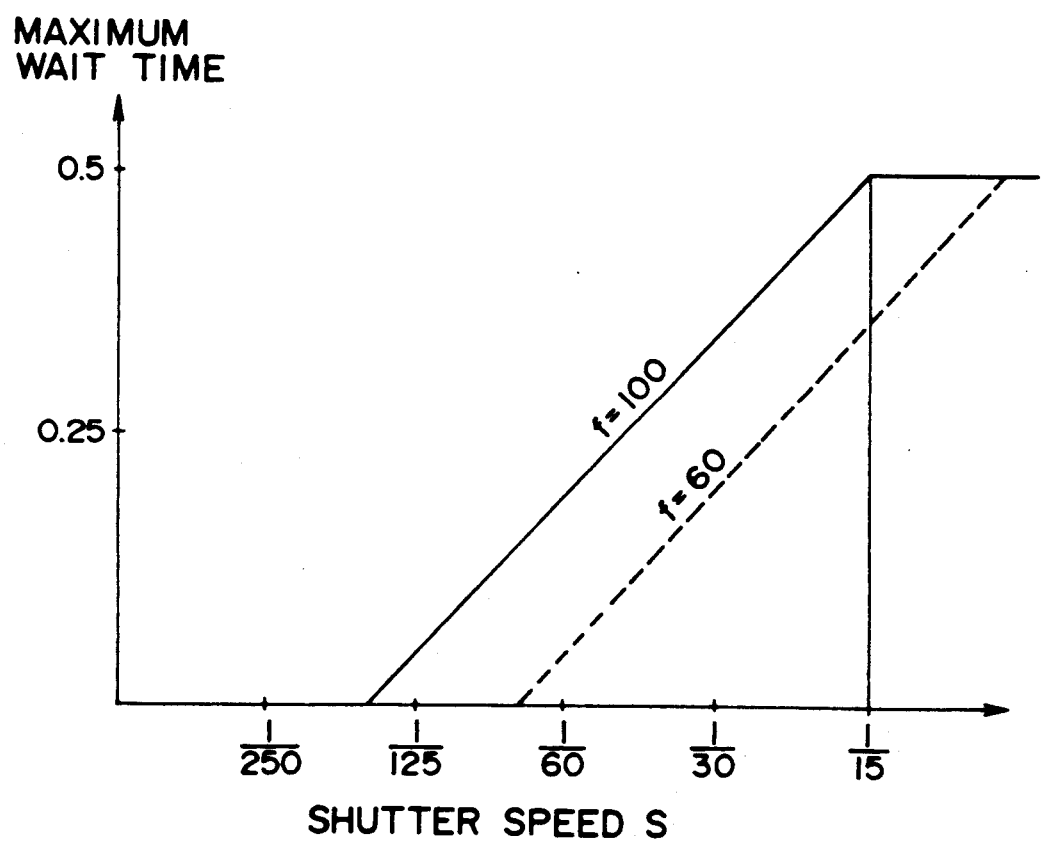
FIG. 14 is a diagram showing the relationship between the shutter speed and the maximum wait time for discriminating shutter permission.

FIG. 14 shows the relationship between the shutter speed and the maximum wait time for discriminating shutter permission.

With the shutter second (about 1/15 in this case) for which a shake doe not seem to become stable even after waiting a predetermined period of time, a shutter open enable signal to forcibly open the shutter is output after a given period of time (e.g., about 0.5 sec).

At a shutter speed S faster than predetermined value, since a shake need not be considered, a shutter-open enable signal is output at the same timing as a shutter open signal from the shutter timing generator 14 is supplied irrespective of the predicted amount of shaking.

At an intermediate shutter second, the shutter opening should wait for a shake to become stable, i.e., outputting the shutter-open enable signal is delayed until the maximum wait time corresponding to the shutter second elapses.

This can prevent the time lag from being unnecessarily delayed when there is no chance of a shake becoming stable or prevent the abuse of the predicted amount of shaking when unnecessary.

The solid line in the diagram is a control line for the focus distance f of a zoom lens being 100 mm, and the broken line is a control line for f=60 mm.

It is of course possible to provide more control lines in accordance with different focus distances f, or to shift a reference control line in accordance with the focus distance f in question. Such a determination may easily be realized by a program in a microcomputer (e.g., a CPU) incorporated in a camera.

An alarm signal to lock the shutter release may be output instead of the shutter-open enable signal, after a predetermined period of time elapses.

Figure 15:
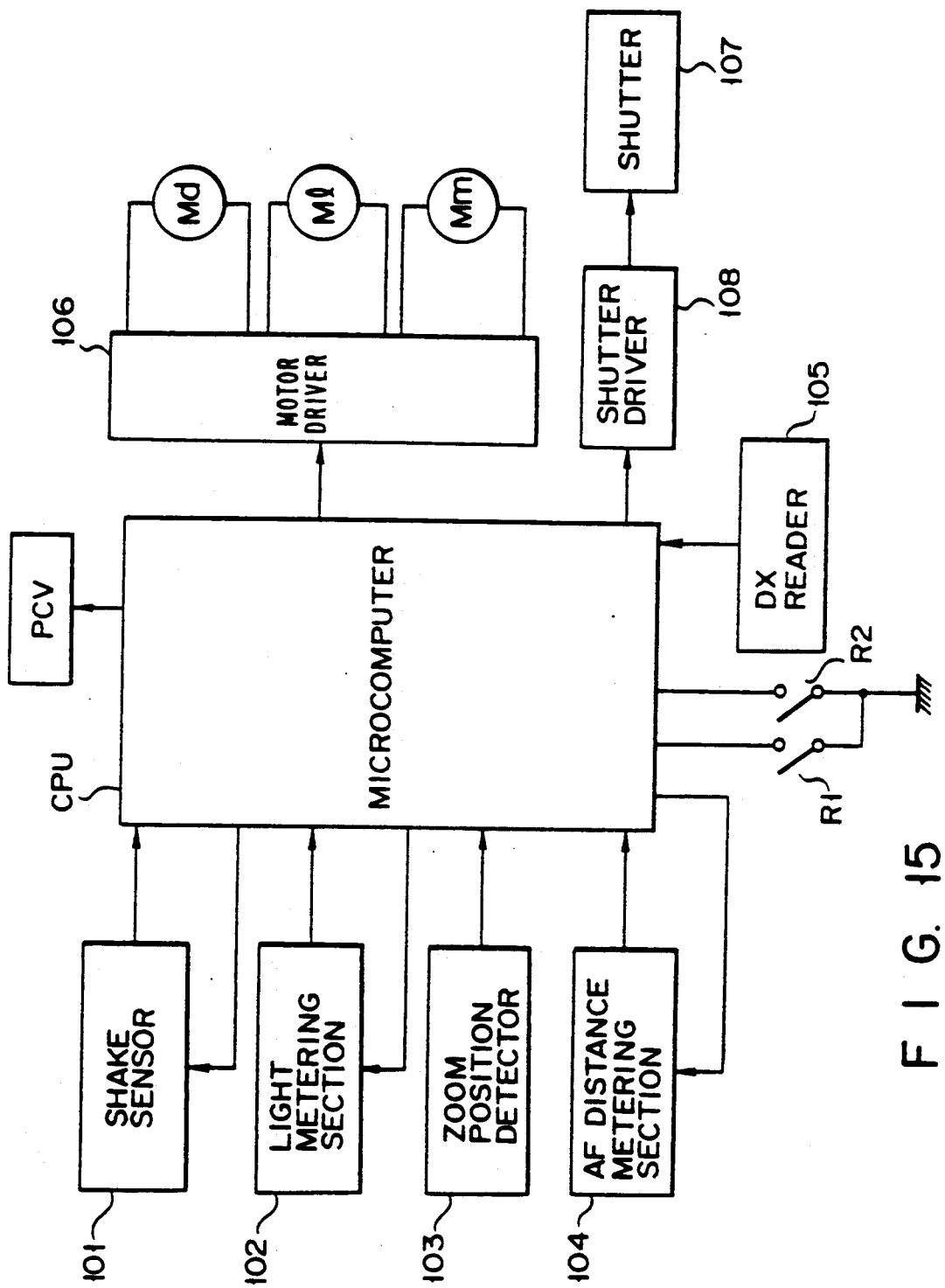
FIG. 15 is a block diagram showing an example of realizing the embodiment in FIG. 1 using a CPU.

FIG. 15 illustrates a specific example to realize the present invention using a microcomputer (CPU); only the portion concerning the present invention is shown The CPU executes the general sequence control of the camera. R1 and R2 are two-staged release switches; R1 is a first release switch, and R2 a second release switch. A shake sensor 101 outputs the amount of shaking when requested by the CPU. As mentioned earlier, the sensor 101 may be a combination of a light-emitting diode and a phototransistor, an acceleration sensor, a CCD sensor or the like.

A light metering section 102 is a sensor to meter the brightness of a target.

A zoom position detector 103 detects the focus distance f of the zoom lens, and may be realized by an absolute position encoder, a photo interrupter (P.I.) or the like which counts a pulse to compute the relative position.

As an AF distance metering section 104, a TTL phase-difference type CCd sensor may be used for a simple lens reflex camera or an active AF type infrared light emitting PSD (position detecting element) may be used for a lens shutter type.

A DX reader 105 is a DX contact piece in a Patrone chamber in the camera body (not shown).

A PCV is a (piezo) ceramic oscillator which oscillates an alarm sound

Motors connected to a motor driver 106 are an aperture motor Md, a lens driving motor Ml and a mirror-facing-up motor Mm. These motors are used in a single lens reflex camera. A lens shutter camera may be considered not to have the motors Md and Mm.

A shutter 107, controlled by a plunger or a motor, is driven by a shutter driver 108 in either case.

Figure 16:
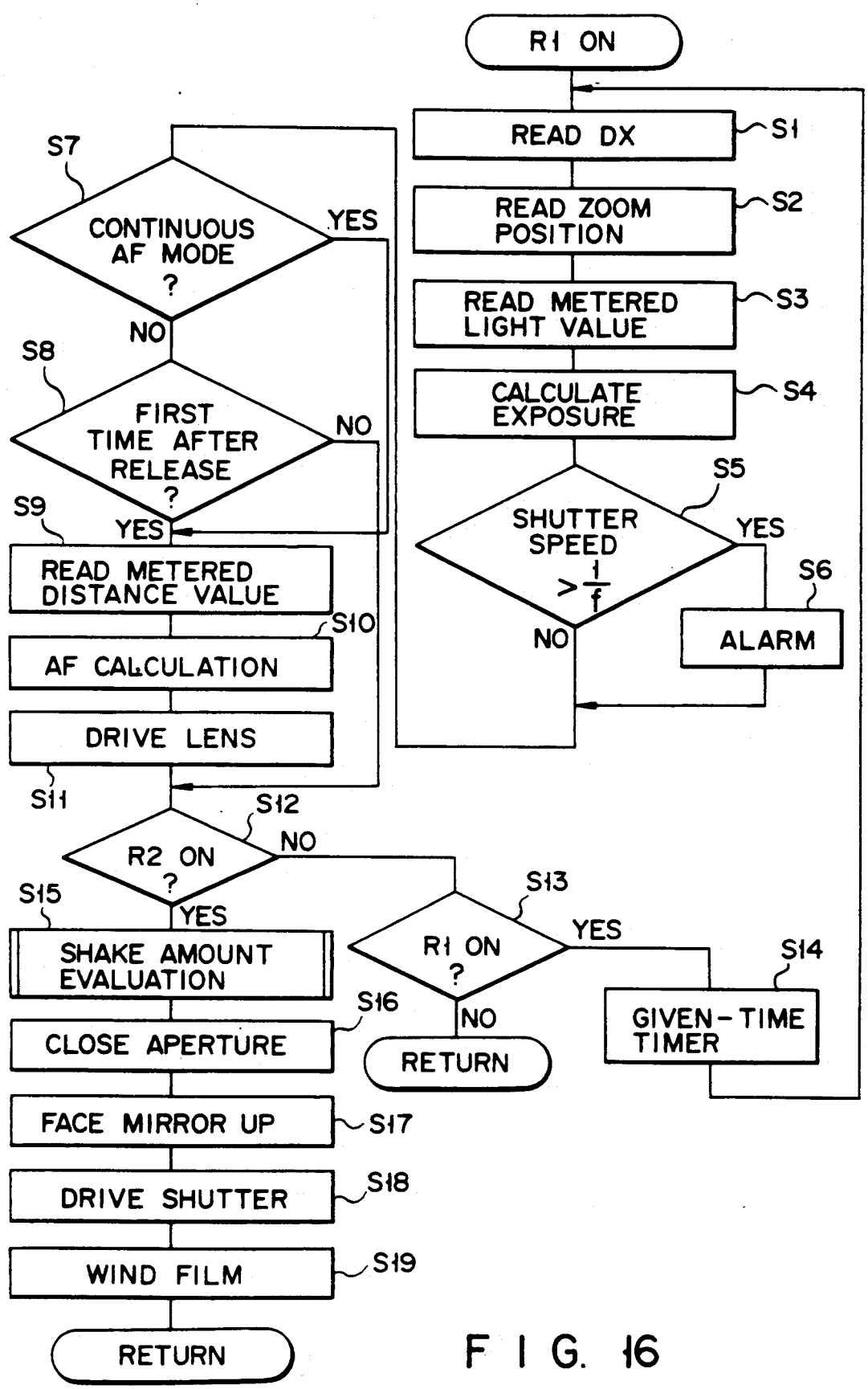
FIG. 16 is a flowchart showing the case where the structure shown in the block diagram in FIG. 15 is realized by using a CPU.

FIG. 16 is a flowchart showing the case where the structure shown in the block diagram in FIG. 15 is realized by using CPU.

The process in the flowchart starts when a switch R1 is rendered on.

The flowchart in FIG. 16 exemplifies the process for the single lens reflex camera.

A DX, a zoom position and a metered value are read to calculate an exposure (steps S1 to S4). The shutter speed is computed during the exposure calculation in step S4. When the computed shutter speed is below the reciprocal of the zooming focus distance, 1/f, the PCV alarms the photographer by the sound (step S5 and S6), so that the photographer may be careful not to cause shaking when picking up the image.

An LED (not shown) in the viewfinder may generate an alarming sound, instead of the PCV.

In an AF sequence in the flowchart, a metered distance value is read from the AF distance metering section, and a lens-protruding amount is determined by the AF calculations, so that the lens is driven accordingly (step S9 to S11).

If a switch R2 is switched on, the process moves to a image-pickup sequence. When the switch R2 is not rendered on, the above-described sequence is repeated by a predetermined time until the switch R1 is switched off (steps S13 and S14).

The image-pickup sequence has a subroutine where the amount of shaking is metered and it is discriminated whether or not the shutter can be released (step S15).

If the shutter release is allowed, the subroutine ends in this case. The subroutine will be described in detail later.

A signal from the shutter-timing generator 14 in FIG. 5 is therefore generated immediately before the subroutine for evaluating the amount of shaking.

After the shutter release is allowed, the aperture of the shutter closes and the mirror faces up, thereby driving the shutter (steps S16 to S18). Ideally, the subroutine for evaluating the amount of shaking should be performed after the mirror faces up, so that a time lag until the shutter is driven is reduced. Since the discrimination time is sometimes required 0.5 sec at the maximum, however, the image-pickup sequence in this case is processed in the order as described above, in order not to give uncertainty to the photographer which can not see by the viewfinder in the duration.

In a recent camera, since closing the shutter aperture and facing up the mirror are preformed at the same time, the time lag during this process is only 10 ms in total. Thus, the above-described processing order of the sequence may be applicable for this case.

Then, a film is wound, and a release sequence is terminated (step S19).

FIG. 17 exemplifies the release sequence of a lens shutter camera. Differences between this sequence and the one in FIG. 16 are that a continuous AF mode is not required and that the AF lens is driven after the switch R2 is switched on. Since the shutter in this case also serves as an aperture, the flowchart does not include steps for facing the mirror up and for closing the aperture.

The shutter-timing signal is generated after the lens is driven. In the lens shutter camera, the shutter can be driven immediately after the subroutine for evaluating the amount of shaking is completed, so that no time lag after evaluation occurs. The present invention can be therefore utilized more effectively.

Three examples of the subroutine for the "shake amount evaluation" will now be explained.

Figure 18:
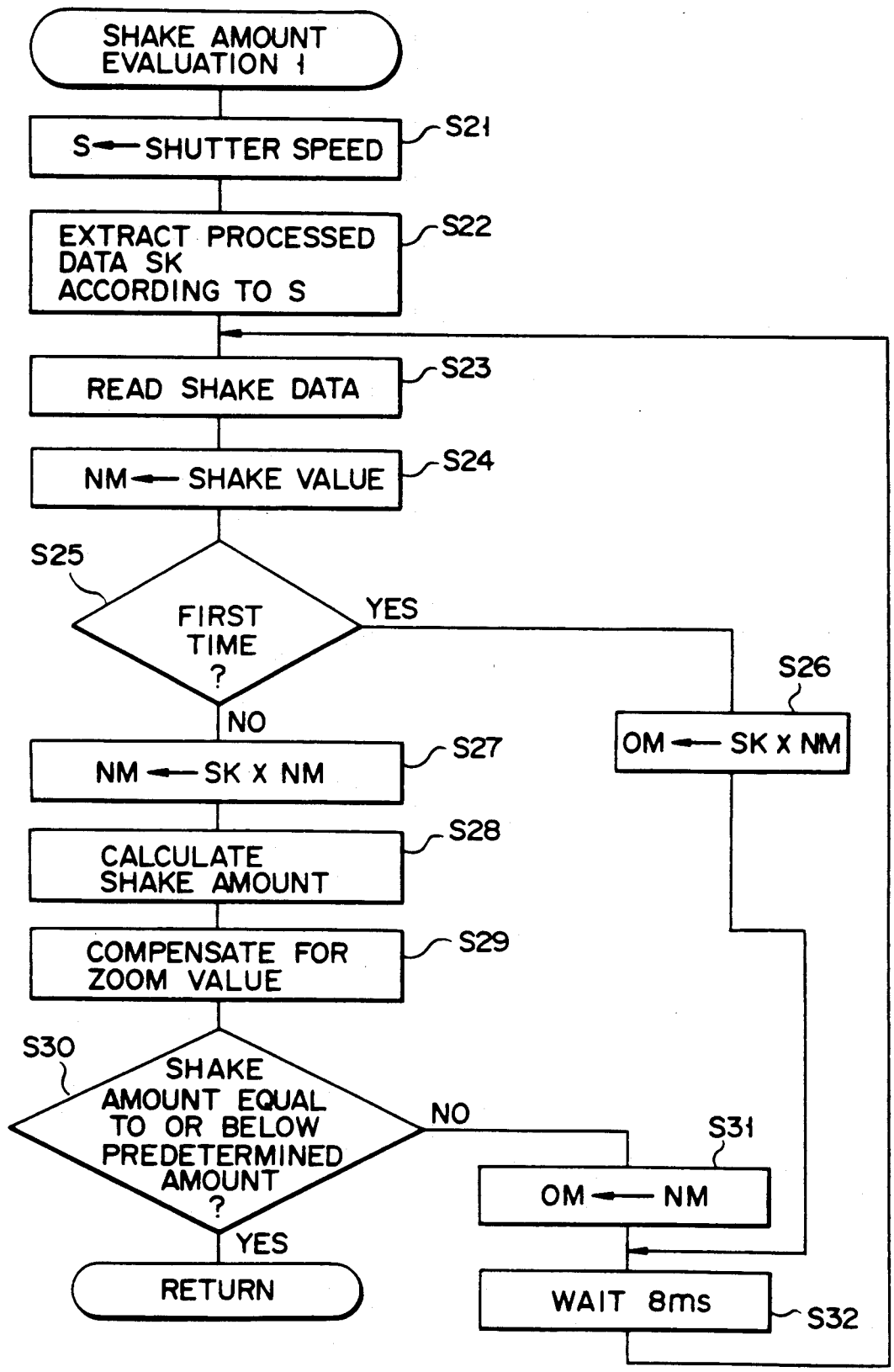
FIG. 18 is a flowchart illustrating a subroutine for evaluation of the amount of shaking along the block diagram in FIG. 5.

FIG. 18 illustrates a subroutine for the "shake amount evaluation" along the block diagram in FIG. 5.

First, the shutter speed is set to a variable S from which processed data SK is extracted referring to a ROM Table or the like in the CPU (steps S21 and S22).

The S-SK table is exemplified in FIG. 19. In this invention, since the sampling speed for metering the amount of shaking is 8 ms, it matches with the shutter speed of 1/125. That is, when S=1/125, SK=1. When the sampling speed differs from the mentioned one, the table in FIG. 19 has only to be prepared in accordance with the sensitivity of the shake sensor.

Then, shake data is fetched from the shake sensor (step S23).

Though not illustrated in the flowchart, when the shake sensor is designed to output shake data as position information or the absolute value of a signal, this value is subtracted from the previous metered value to acquire the amount of shaking.

The amount of shaking is set to a variable NM (step S24).

When this is the first metering, NM is multiplied by SK, the resultant value is set to OM and the amount of shaking is metered again after a sampling time of 8 ms (step S26).

That is, NM is a variable to store the current amount of shaking, and OM is a variable to store the previous amount of shaking.

When it is not the first metering, the acquired SK is multiplied by NM to provide data equivalent to the actual amount of shaking (step S27).

Then, the predicted amount of shaking is calculated from OM and NM (step S28). When it is the second metering, since NM has already multiplied by SK, the computation can be performed directly. Then, the amount of shaking is compensated for by the focus distance of the camera (step S29). This is because that as the focus distance is longer, the amount of shaking of the film surface is influenced by the shake of the camera.

If the amount of shaking simply corresponds to the focus distance $f_0$, the compensation may be made by multiplying the amount of shaking by $f/f_0$.

If a TTL-AF sensor or the like is used as the shake sensor, the amount of shaking already includes the focus distance information, the zoom value need not be compensated.

Then, it is determined whether or not the compensated amount of shaking is equal to or smaller than a predetermined value (step S30). If the former value is above the predetermined value, NM is moved to OM (NM after the second metering has already multiplied by SK), and the amount of shaking is metered every 8 ms before repeating the above-described sequence of processes (steps S31 and S32).

Figure 20:
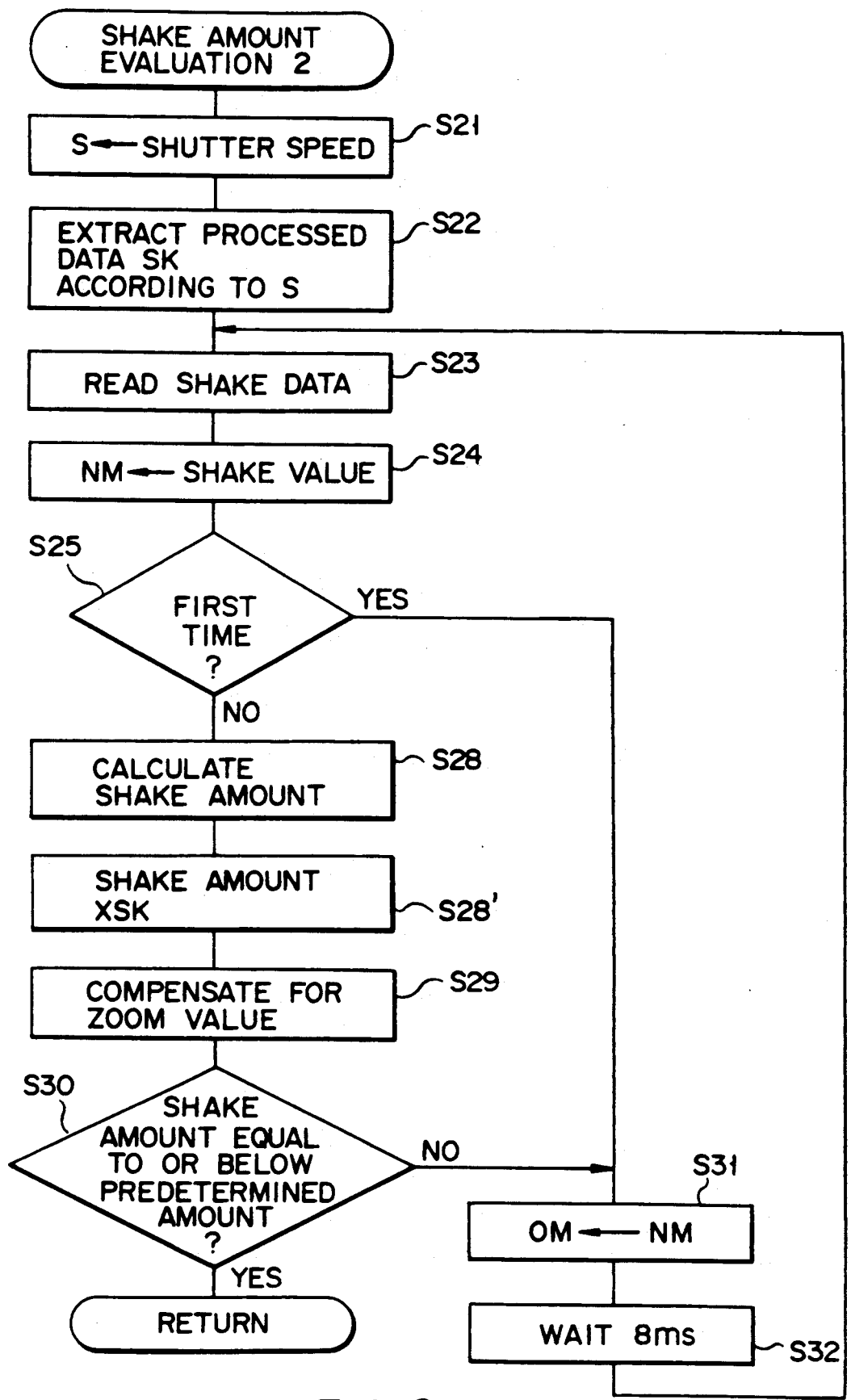
FIG. 20 is a flowchart illustrating a second embodiment of evaluation of the amount of shaking.

FIG. 20 illustrates a second embodiment of evaluation of the amount of shaking. This example differs from the flowchart shown in FIG. 18 only in that the computation of the amount of shaking is performed on the basis of the metered amount of shaking, and after the calculation, the calculated amount of shaking is multiplied by SK (step S28').

Accordingly, the metered amount of shaking is set to NM and OM.

FIG. 21 illustrates a third embodiment of evaluation of the amount of shaking. This example differs from the flowchart shown in FIG. 20 only in that the amount of shaking is not multiplied by SK, the zoom value is compensated for based on the amount of shaking at the sampling time of 8 ms or S=1/125, and the allowable amount of shaking is acquired from the shutter speed referring to the associated table (step S33). The table in use may be the one shown in FIG. 22. While the table shown in FIG. 22 is prepared simply with S=1/125 as a reference, it may be prepared to make the actual allowable amount of shaking smoother as the shutter speed gets slower.

FIG. 24 illustrates another structure of the above-described shutter enable discriminating section 6.

Referring to FIG. 24, a maximum wait time determining section 61 determines the maximum wait time from the focus distance f from the aforementioned zoom position detector 12 and the shutter speed S from the shutter-speed determining section 2. In this case, this structure can be easily realized by providing the above-described table shown in FIG. 14.

Figure 25:
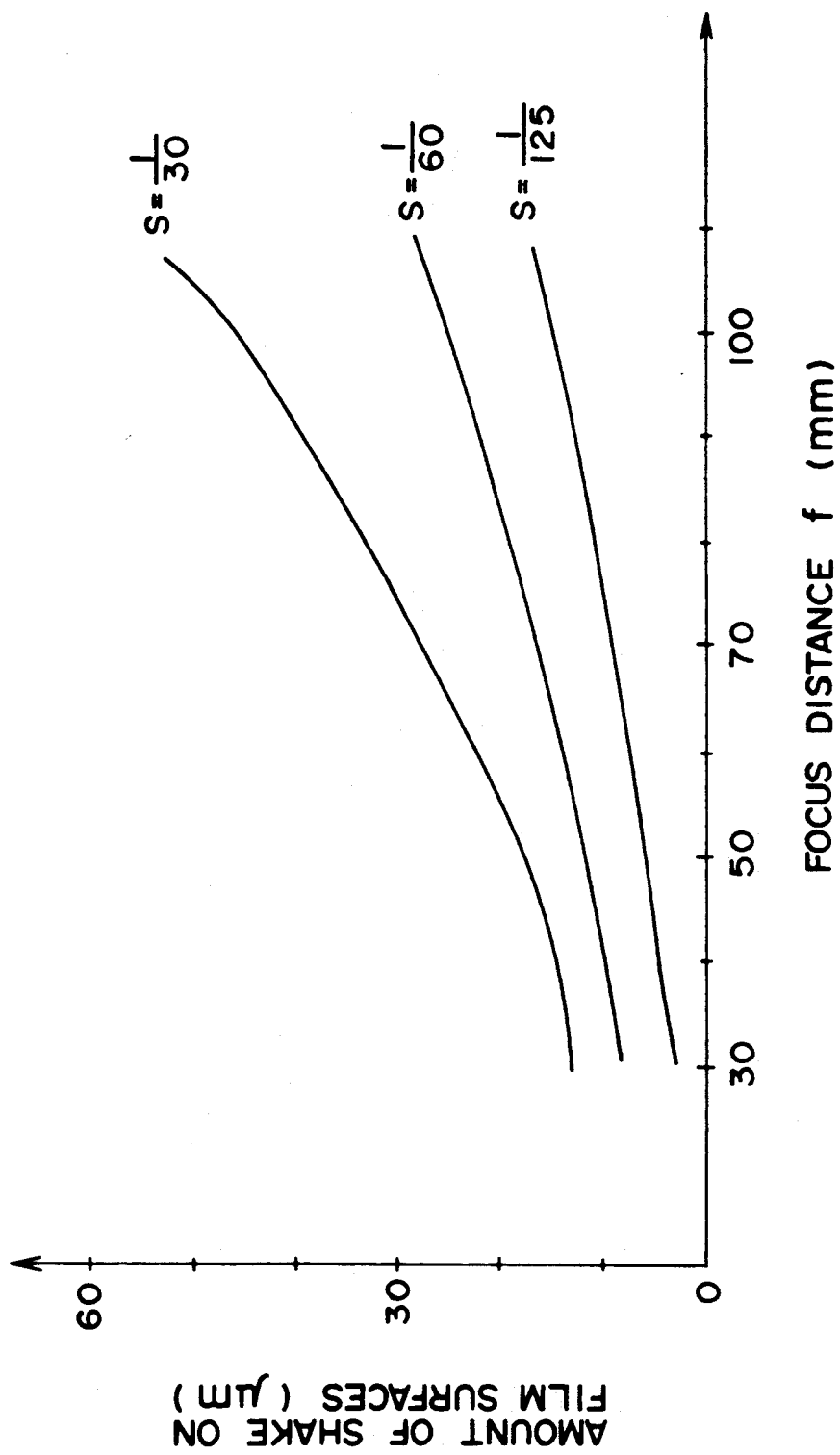
FIG. 25 is a diagram showing the relationship between a focus distance used to determine an allowable amount of shaking and a shutter speed with respect to the allowable amount of shaking.

An allowable shake amount determining section 62 determines the allowable amount of shaking from the focus distance f and shutter speed S. In this case, this can be realized by storing the relationship between the focus distance f and the shutter speed S with respect to the allowable amount of shaking as shown in FIG. 25 as parameters.

A minimum value storage section 63 stores the minimum value of the predicted amount of shaking sup plied from the above-described shake amount calculating section 5 in synchronism with the timing signal from the reference time generator 7.

A counter 64 counts the timing signal from the reference time generator 7 in response to the shutter open signal from the shutter timing generator 14.

A comparator 65 compares the maximum wait time from the maximum wait time determining section 61 with the output of the counter 64.

An expected shake amount determining section 66 determines an expected amount of shaking based on the predicted amount of shaking stored in the minimum value storage section 63 for each sampling time until the wait time reaches the output of the comparator 65 or the maximum wait time. This expected amount of shaking is determined in such a way that if the amount of shaking is equal to or less than, for example, 1.2 times the minimum value of the predicted amount of shaking.

A multiplexer 67 is designed to select the allowable amount of shaking determined by the allowable shake amount determining section 62 based on the control curves in FIG. 25 upon reception of a signal from the comparator 65 which indicates that the output of the counter 64 has not reached the maximum wait time, and select the expected amount of shaking determined by the expected shake amount determining section 66 when the output of the counter 64 has exceeded the maxim wait time.

A subtracter 68 performs subtraction of the output of the multiplexer 67 and the predicted amount of shaking from the shake amount calculating section 5, and generates a shutter-open enable signal when the result of the subtraction is equal to or below a predetermined value.

In other words, the shutter enable discriminating section 6 first determines the maximum wait time and the allowable amount of shaking from the focus distance and the shutter speed S. Then, when the wait time does not reach the maximum wait time, the allowable amount of shaking is selected to be subtracted from the predicted amount of shaking. When the result of the subtraction is equal to or below a predetermined value, opening the shutter is enabled.

When the time has exceeded the maximum wait time, the expected amount of shaking i selected to be subtracted from the predicted amount of shaking With the above structure, even when the wait time exceeds the maximum wait time, to thereby evaluate the amount of shaking so far, the shutter can be open when it is the expected minimum amount of shaking.

As described above, the exposing operation starts in the condition which does not influence the pickup image.

That is, the total amount of shaking during shutter opening is predicted based on the current and previous shake data acquired by processing the shake output with the shutter speed and the sampling time, and the timing for opening the shutter is controlled based on the predicted amount of shaking. Accordingly, it is possible to easily and quickly make the prediction and easily cope with a shake of a complicated motion. The exposure control apparatus even with a simple structure can reduce the influence of hand shaking to an allowable range within the shortest time lag.

FIG. 26 is a flowchart in the case where the structure in FIG. 24 is realized using a CPU. In this example, while the subroutine is titled "shutter enable discrimination 1," this subroutine has only to be executed instead of the "shake amount evaluation" subroutine in FIG. 16 or 17 when such is to be executed. Steps #1 to #4 correspond to the structure shown in FIG. 24, and the other steps are the same as what is shown in FIG. 18. The subroutine in FIG. 26 may of course be executed in the flowcharts in FIGS. 21 and 22. First, the maximum time is determined based on the table in FIG. 14 (step #1). Then, after the allowable amount of shaking for the focus distance is determined on the base of the table in FIG. 25, the timer is started (steps #2 and #3).

Thereafter, almost the same sequence of steps as the subroutine for the "shake amount evaluation" will be executed. Differences are such that there is step #4 where the minimum amount of shaking among the metered amounts is stored every 8 ms, and after the maximum wait time is elapsed, the allowable amount of shaking is changed to the stored minimum amount of shaking multiplied by a coefficient n (steps #5 and #6).

Accordingly, after the maximum wait time is elapsed, the shutter release can be enabled, considering that the amount of hand shaking of the photographer will not be reduced.

Figure 27:
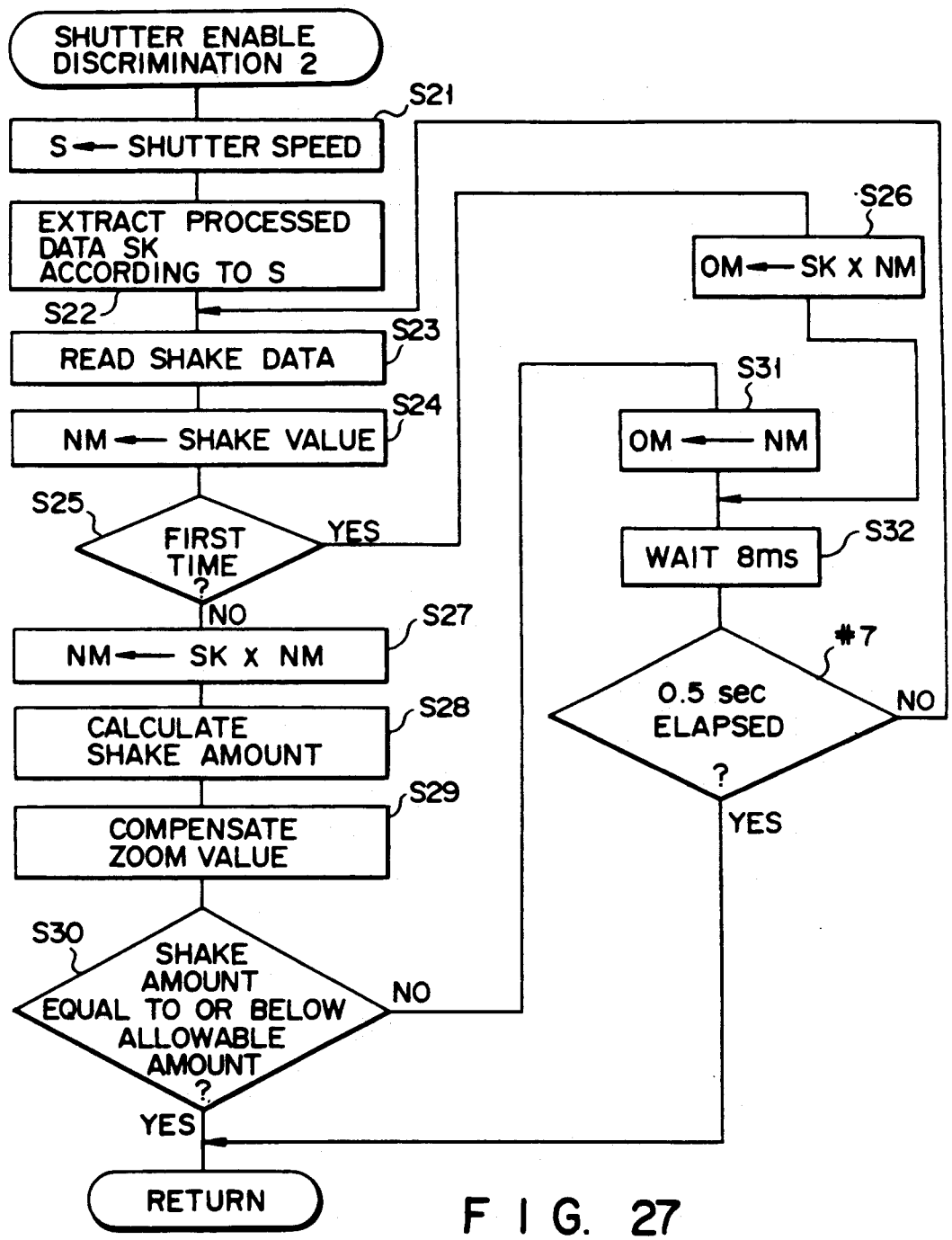
FIG. 27 is a flowchart in the case where the flow in FIG. 26 is realized simply.

FIG. 27 illustrates the case where the flowchart in FIG. 26 is realized simply. This example differs from the one shown in FIG. 26 in that the allowable amount of shaking is constant, independent of the shutter speed or the zoom position, and the maximum wait time is fixed to 0.5 sec (step #7).

When 0.5 sec is elapsed, the shutter release is enabled without conditions. This is because that a shake depends greatly on the vibration at the time of pressing the release switch, and the amount of shaking is stabilized to what corresponds to the skill of the photographer after about 0.5 sec. While the maximum wait time is set to 0.5 sec in this example, it may be set to other values as well.

FIG. 28 shows an embodiment to permit a fuzzy calculating section 5a to predict the amount of shaking based directly on the shake amount data from the shake amount detecting section 1 or based on three inputs, the current data, the previous data, the data one sampling time older than this previous data, the latter two acquired by sending the current data through storage sections 4a and 4b, respectively. Reference numeral "7" is a reference time generator corresponding to the one shown in FIG. 1.

The example of making a fuzzy prediction based on the current data and previous data has already been described referring to FIGS. 10 to 12. As that example has only two inputs, the prediction should be made on the premise that the maximum amount of shaking is 100 $\mu$m at a frequency of 3.5 Hz, for example.

If three inputs are used as shown in FIG. 28, it is possible to predict the amount of shaking by an approximate curve. As the membership function and the prediction method can be considered as extension of those described earlier, no particular description will be given.

The fuzzy calculating section 5a can easily be realized by using the techniques disclosed in Japanese Unexamined Patent Publication Nos. 2-224029 and 2-068639 which the present inventors have already proposed.

Figure 29:
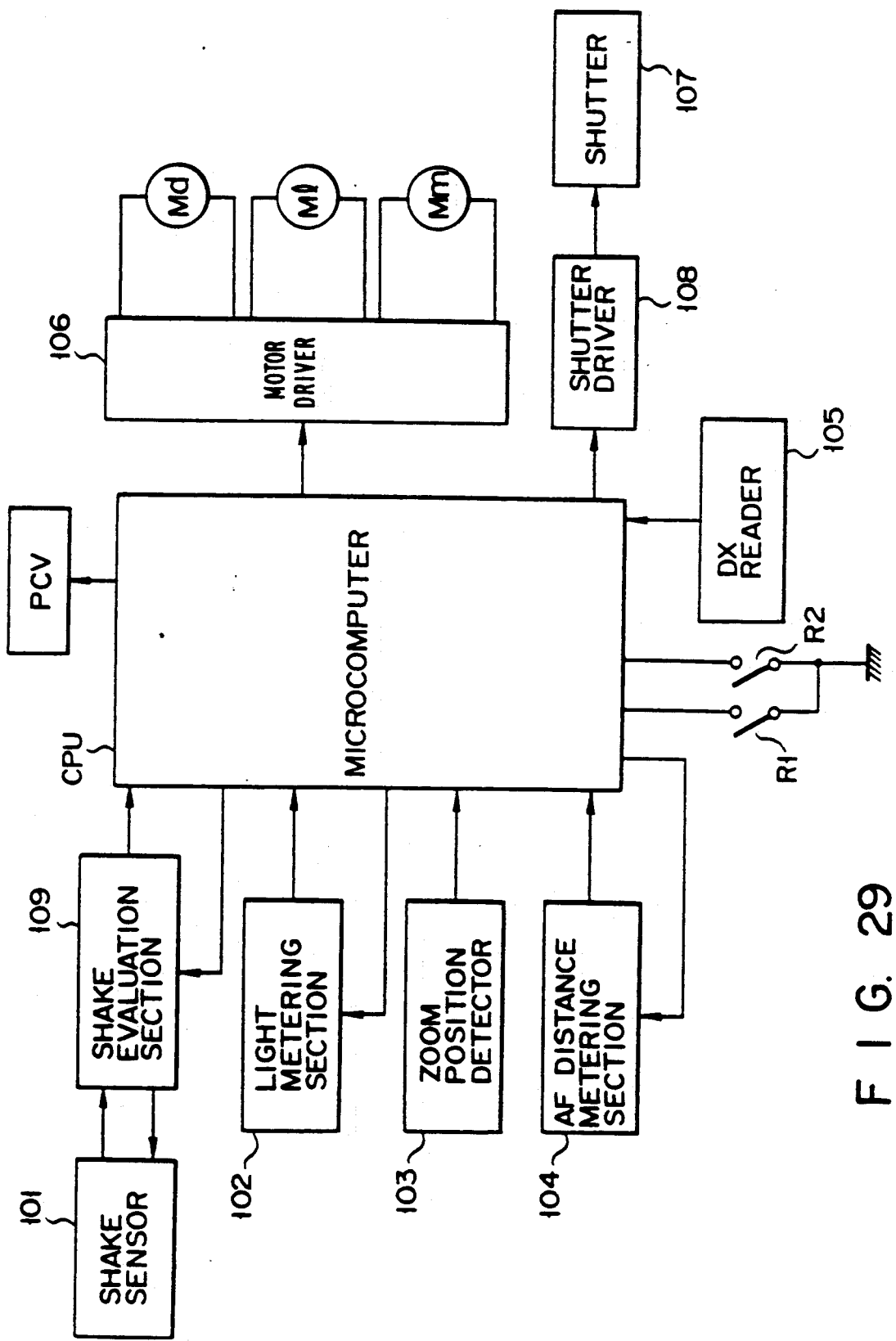
FIG. 29 is a structural diagram of a shake evaluation section realized by hardware.

FIG. 29 illustrates an example which is the same as the one shown in FIG. 15 except that the function of a shake evaluation section 109 is removed from the CPU and is realized by hardware.

As the CPU has only to send an evaluation instruction to the shake evaluation section 109 in one step in shown in FIG. 16 or 17 and advance to the next step when this evaluation is approved, the flowchart for the function of the CPU will be omitted The shake evaluation section 109 can be realized by the structure shown in FIG. 28.

While the foregoing description of the embodiments has been given with reference to the case where a shake is caused by a user's hand, this invention is not limited to this particular case, but may be applied to a type which simply reduces the influence of a shake caused by the vibration of a camera installed in a vehicle.

This invention may be modified in various other manners without departing from the scope and spirit of the invention As described above, the present invention can provide exposure control apparatus for a camera with a shake countermeasure which can cope with a complicated shaking movement even with a simple structure, and can shorten a time lag involved in the detection of shaking, thereby minimizing the influence of the shaking o a pickup image.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. An exposure control apparatus for a camera comprising:
    shake amount detecting means for repeatedly detecting shaking of a camera in a sampling time interval shorter than a hand shaking cycle;
    exposure calculating means for calculating a shutter speed concerning an opening of a shutter of said camera based on a sensitivity of a film to be loaded in said camera and brightness information of a object to be picked up by said camera;
    data processing means for acquiring processed data from a product of said shutter speed calculated by said exposure calculating means and an amount of shaking detected by said shake amount detecting means every time said amount of shaking is detected by said shake amount detecting means;
    storage means for storing said processed data output from said data processing means;
    shake amount predicting means for receiving said processed data from said data processing means and said processed data stored in said storage means to predict a total amount of shaking while said shutter is open, every time said processed data is output from said data processing means;
    a release switch for preparing for beginning of an exposing operation on said film;
    shutter enable discriminating means for discriminating permission of a shutter release when a latest predicted total amount of shaking during shutter opening, output from said shake amount predicting means, is equal to or smaller than a predetermined amount, every time said release switch is operated and said shake amount predicting means predicts said total amount of shaking; and
    shutter control means for starting opening said shutter based on a signal from said shutter enable discriminating means and controlling an exposure time based on said shutter speed calculated by said exposure calculating means.

2. An exposure control apparatus according to claim 1, wherein said shutter enable discriminating means makes discrimination in light of a shutter time lag from the beginning of said shutter opening to the beginning of actual exposure.

3. An exposure control apparatus according to claim 1, wherein said shake amount predicting means performs prediction by linear approximation.

4. An exposure control apparatus according to claim 1, wherein said shake amount predicting means performs prediction using fuzzy prediction.

5. An exposure control apparatus for a camera comprising:
    shutter-speed determining means for determining a shutter speed concerning an opening of a shutter of a camera;
    shake amount detecting means for detecting an amount of shaking of said camera for each sampling time;
    shutter timing generating means for generating a shutter release signal to instruct an exposing operation of a film loaded into said camera;
    maximum wait time determining means for determining a maximum wait time from generation of said shutter release signal from said shutter timing generating means to generation of a shutter enable signal based on an output of said shutter-speed determining means;
    allowable shake amount determining means for determining a maximum allowable amount of shaking based on said output of said shutter-speed determining means;
    minimum value storage means for storing a minimum value of said amount of shaking output from said shake amount detecting means;
    expected shake amount determining means for determining an expected amount of shaking of a looser reference than said minimum value of said amount of shaking stored in said minimum value storage means based on said minimum value;
    timer means for measuring time from generation of said shutter release signal from said shutter timing generating means;
    comparator means for comparing an output of said timer means with said maximum wait time determined by said maximum wait time determining means;
    multiplexer means for receiving an output of said comparator means, outputting said expected amount of shaking determined by said expected shake amount determining means until said maximum wait time elapses, and outputting said allowable amount of shaking determined by said allowable shake amount determining mean after said maximum wait time elapses; and shutter enable signal output means for comparing an output of said shake amount detecting means with an output of said multiplexer means and outputting said shutter enable signal when a comparison result indicates a predetermined relationship.

6. An exposure control apparatus according to claim 5, wherein said expected shake amount determining means acquires said expected amount of shaking by multiplying said minimum value of said amount of shaking by a constant.

7. An exposure control apparatus according to claim 5, further comprising focus distance detecting means for detecting a focus distance of a zoom lens of said camera, and wherein said maximum wait time determining means determines said maximum wait time using said focus distance detected by said focus distance detecting means in addition to said shutter speed, and said allowable shake amount determining means determines said allowable amount of shaking using said focus distance detected by said focus distance detecting means in addition to said shutter speed.

8. An exposure control apparatus for a camera comprising:
shake amount detecting means for detecting amount of shaking of a camera for each sampling time interval shorter than a hand shaking cycle;
shutter-speed determining means for determining a shutter speed concerning an opening of a shutter of a camera;
compensation means for compensating for said amount of shaking detected by said shake amount detecting means with said shutter speed determined by said shutter-speed determining means;
storage means for storing a shake compensation value output from said compensation means;
prediction means for predicting a total amount of shaking during exposure of a film loaded in said camera by opening of said shutter from a current shake compensation value compensated by said compensation means and a previous shake compensation value stored in said storage means, every time said shake amount detecting means detects said amount of shaking; and
discriminating means for discriminating whether or not said exposure should be started based on said total amount of shaking acquired by said prediction means, in response to a shutter release signal to prepare for beginning of said exposure.

9. An exposure control apparatus according to claim 8, wherein said compensation means divides said shutter speed by said sampling time and computes a product of said amount of shaking and a result of the division.

10. An exposure control apparatus according to claim 8, wherein said discriminating means makes discrimination in light of a shutter time lage from the beginning of said shutter opening to the beginning of actual exposure.

11. An exposure control apparatus for a camera comprising:
shake amount detecting means for detecting amount of shaking of a camera for each sampling time interval shorter than a hand shaking cycle;
storage means for storing a shake compensation value output from said shake amount detecting means;
prediction means for predicting an amount of shaking from a current amount of shaking and a previous amount of shaking stored in said storage means, every time said shake amount detecting means detects said amount of shaking;
shutter-speed determining means for determining a shutter speed concerning an opening of a shutter of a camera;
compensation means for compensating for said amount of shaking predicted by said prediction means with said shutter speed determined by said shutter-speed determining means to acquire a total amount of shaking during opening of said shutter; and
discriminating means for discriminating whether or not exposure of a film loaded in said camera should be started based on said total amount of shaking acquired by said prediction means, in response to a shutter release signal to prepare for a shutter opening operation.

12. An exposure control apparatus for a camera comprising:
shake amount detecting means for detecting amount of shaking of a camera for each sampling time interval shorter than a hand shaking cycle;
storage means for storing a shake compensation value output from said shake amount detecting means;
prediction means for predicting an amount of shaking from a current amount of shaking and a previous amount of shaking stored in said storage means, every time said shake amount detecting means detects said amount of shaking;
shutter-speed determining means for determining a shutter speed concerning an opening of a shutter of a camera; and
discriminating means for comparing an amount of shaking output from said prediction means with a predetermined value determined by said shutter speed determined by said shutter-speed determining means in response to a shutter release signal to prepare for a shutter opening operation to thereby discriminate whether or not exposure of a film loaded in said camera should be started.

13. An exposure control apparatus for a camera for starting an exposing operation with an exposure time based on at least a brightness of an object to be picked up and a sensitivity of a film in response to a release signal from a release operation member, comprising:
output means for outputting information about said exposure time;
detecting means for repeatedly detecting an amount of shaking of said camera in a predetermined detection interval;
processing means for repeatedly detecting an amount of shaking of said camera in a predetermined detection interval;
processing means for processing said amount of shaking detected by said detecting means based on said exposure time information from said output means;
storage means for repeatedly storing an output value of said processing means;
prediction means for predicting an amount of shaking in said exposure time from a currently processed output value from said processing means and a previously processed value stored in said storage means in a case where said exposing operation is started after a predetermined period of time; and
determining means for determining whether or not said exposing operation should be started after said predetermined period of time based on an output of said prediction means.

14. An exposure control apparatus according to claim 13, wherein said processing means performs a computation given below:

$$m \times S/\Delta t$$

where m is said amount of shaking detected by said detecting means, s is said exposure time information from said output means, and $\Delta t$ is said shake detection interval in said detecting means.

15. An exposure control apparatus according to claim 13, wherein said prediction means predicts said amount of shaking by a fuzzy prediction.

16. An exposure control apparatus according to claim 13, wherein said determining means permits said exposing operating to be started when said amount of shaking predicted by said prediction means becomes equal to or less than a predetermined allowable amount.

17. An exposure control apparatus for a camera for detecting an amount of shaking of a camera in response to a release signal from a release operation member, acquiring from said detected amount of shaking a timing at which an influence of shaking on film exposure and starting an exposing operation at said timing, comprising:

exposure time calculating means for acquiring information of an exposure time based on at least a brightness of an object to be picked up and a sensitivity of a film;

detecting means for repeatedly detecting an amount of shaking of said camera in a predetermined detection interval;

processing means for processing said amount of shaking detected by said detecting means based on said exposure time information acquired by said exposure time calculating means;

storage means capable of repeatedly storing a value processed by said processing means;

prediction means for predicting an amount of shaking in said exposure time from a value currently processed in said processing means and a previously processed value stored in said storage means in a case where said exposing operation is started after a predetermined period of time; and determining means for determining whether or not said exposing operation should be started after said predetermined period of time based on an output of said prediction means, said determining means including an allowable shake amount calculating circuit for calculating an allowable amount of shaking from a focus distance of a lens, a comparator for comparing said allowable amount of shaking with said predicted amount of shaking from said prediction means, and a circuit for outputting a shutter-open enable signal when said predicted amount of shaking is detected to be equal to or small than said allowable amount of shaking in said comparator.

18. An exposure control apparatus according to claim 17, wherein said processing means performs a computation given below:

$$m \times S/\Delta t$$

where m is said amount of shaking detected by said detecting means, s is said exposure time information from said output means, and $\Delta t$ is said shake detection interval in said detecting means.

19. An exposure control apparatus according to claim 17, wherein said prediction means predicts said amount of shaking by a fuzzy prediction.

20. An exposure control apparatus according to claim 17, wherein said determining means further includes a limit time calculating circuit for acquiring a delay limit time from said focus distance of said lens, a timer circuit for starting measuring time in response to said release signal, a second comparator for comparing an output of said timer circuit with said limit time, and a control circuit for forcibly outputting said shutter-open enable signal when said output of said timer circuit is detected to have exceeded said limit time in said second comparator.

21. An exposure control apparatus according to claim 17, wherein said determining means further includes second storage means for storing a minimum value of said predicted amount of shaking output from said prediction means, an expected shake amount calculating circuit for acquiring an expected amount of shaking greater by a predetermined amount than said minimum value of said predicted amount of shaking from am output of said second storage means, a limit time calculating circuit for acquiring a delay limit time from said focus distance of said lens, a timer circuit for starting measuring time in response to said release signal; a second comparator for comparing an output of said timer circuit with said limit time, and a replacing circuit for replacing said allowable amount of shaking in said first comparator with said expected amount of shaking when said output of said timer circuit is detected to have exceeded said limit time in said second comparator.

22. An exposure control apparatus for a camera for detecting an amount of shaking of a camera in response to a release signal from a release operation member, acquiring from said detected amount of shaking a timing at which an influence of shaking on film exposure and starting an exposing operation at said timing, comprising:

exposure time calculating means for acquiring an exposure time based on at least a brightness of an object to be picked up and a sensitivity of a film;

detecting means for repeatedly detecting an amount of shaking of said camera in a predetermined detection interval;

storage means capable of repeatedly storing a value detected by said detecting means;

prediction means for predicting an amount of shaking in said exposure time from a value currently detected by said detecting means and a previously detected value stored in said storage means in a case where said exposing operation is started after a predetermined period of time; and determining means for determining whether or not said exposing operation should be started after said predetermined period of time based on an output of said prediction means.

23. An exposure control apparatus according to claim 22, wherein said prediction means predicts said amount of shaking by a fuzzy prediction.

24. An exposure control apparatus according to claim 22, wherein said determining means includes an allowable shake amount calculating circuit for calculating an allowable amount of shaking from a focus distance of a lens and information of said exposure time, a comparator for comparing said allowable amount of shaking with said predicted amount of shaking from said prediction means, and a circuit for outputting a shutter-open enable signal when said predicted amount of shaking is detected to be equal to or small than said allowable amount of shaking in said comparator.

25. A shake amount predicting apparatus for detecting an amount of shaking of a camera in response to a release signal from a release operation member, and predicting an amount of shaking in an exposure time from said detected amount of shaking in a case where an exposing operation is started after a predetermined period of time, comprising:

exposure time calculating means for acquiring an exposure time based on at least a brightness of an object to be picked up and a sensitivity of a film;
   detecting means for detecting an amount of shaking of said camera at least twice in a predetermined detection interval;
   processing means for processing said amount of shaking detected by said detecting means based on said exposure time;
   storage means capable of storing a value processed by said processing means; and
   prediction means for predicting an amount of shaking in said exposure time from a value currently processed in said processing means and a previously processed value stored in said storage means in a case where said exposing operation is started after a predetermined period of time.

26. A shake amount predicting apparatus according to claim 25, wherein said processing means performs a computation given below:

$$m \times S / \Delta t$$

where m is said amount of shaking detected by said detecting means, s is said exposure time information from said output means, and it is said shake detection interval in said detecting means.

27. A shake amount predicting apparatus according to claim 25, wherein said prediction means predicts said amount of shaking by a fuzz prediction.

28. A shake amount predicting apparatus for detecting an amount of shaking of a camera in response to a release signal from a release operation member, and predicting an amount of shaking in an exposure time from said detected amount of shaking in a case where an exposing operation is started after a predetermined period of time, comprising:

exposure time calculating means for acquiring an exposure time based on at least a brightness of an object to be picked up and a sensitivity of a film;
   detecting means for detecting an amount of shaking of said camera at least twice in a predetermined detection interval;
   storage means capable of storing a value detected by said detecting means; and
   prediction means for predicting an amount of shaking in said exposure time from a value currently detected by said detecting means and a previously detected value stored in said storage means in a case where said exposing operation is started after said predetermined period of time.

29. A shake amount predicting apparatus according to claim 28, wherein said prediction means predicts said amount of shaking by a fuzzy prediction.

30. An exposure control apparatus for a camera, comprising:

shake amount detecting means for detecting an amount of shaking of said camera at sampling time intervals;
   shutter release signal generating means for generating a shutter release signal for commanding an exposing operation to a film loaded in said camera;
   minimum value storage means for storing a minimum value of said amount of shaking output from said shake amount detecting means;
   allowable shake amount determining means for determining a maximum allowable amount of shaking based on said minimum value of said amount of shaking stored in said minimum value storage means; and
   shutter-open enable signal generating means for comparing an output of said shake amount detecting means with an output of said allowable shake amount determining means after said shutter release signal generating means generates said shutter release signal, and outputting a shutter-open enable signal when a result of comparison indicates a predetermined relationship between said output of said shake amount detecting means and said output of said allowable shake amount determining means.

31. An exposure control apparatus according to claim 30, wherein said allowable shake amount determining means determines said maximum allowable amount of shaking by multiplying said a minimum value of said amount of shaking.

32. An exposure control apparatus for detecting an amount of shaking of a camera, obtaining a timing at which an influence of shaking on film exposure decreases, in accordance with said detected amount of shaking, and starting an exposing operation at said timing, comprising:

exposure time determining means for determining an exposure time to a film loaded in said camera by pre-setting or calculation;
   detecting means for detecting repeatedly an amount of shaking of said camera at predetermined detection intervals;
   storage means capable of storing data of said amount of shaking detected by said detecting means;
   prediction means for predicting an amount of shaking occurring in said exposure time in a case where said exposing operation is started after a predetermined period of time, in accordance with a value currently detected by said detecting means and a previously detected value stored in said storage means; and
   determining means for determining whether or not said exposing operation should be started after said predetermined period of time in accordance with an output of said prediction means.

33. A shake amount predicting apparatus for detecting an amount of shaking of a camera and predicting an amount of shaking occurring in an exposure time in a case where an exposing operation is started after a predetermined period of time, in accordance with said detected amount of shaking, comprising:

exposure time determining means for determining an exposure time to a film loaded in said camera by pre-setting or calculation;
   detecting means for detecting an amount of shaking of said camera at least twice at predetermined detection intervals;

processing means for processing repeatedly said amount of shaking detected by said detecting means based on said exposure time;

storage means capable of storing a value output from said processing means; and prediction means for predicting an amount of shaking occurring in said exposure time in a case where said exposing operation is started after a predetermined period of time, in accordance with a value currently processed in said processing means and a previously processed value stored in said storage means.

34. A shake amount predicting apparatus for detecting an amount of shaking of a camera, and predicting an amount of shaking occurring in an exposure time in a case where an exposing operation is started after a predetermined period of time, in accordance with a detected amount of shaking, comprising:

detecting means for detecting an amount of shaking of said camera at least twice at predetermined detection intervals;

storage means capable of storing a value detected by said detecting means; and prediction means for predicting an amount of shaking occurring in said exposure time in accordance with a value currently detected by said detecting means and a previously detected value stored in said storage means in a case where said exposing operation is started after said predetermined period of time.

35. An exposure control apparatus for a camera, comprising:

shake amount detecting means for detecting repeatedly an amount of shaking of said camera at sampling time intervals;

a first release signal generating means for generating a first release signal for commanding a photographing preparation operation;

a second release signal generating means for generating a second release signal for commanding an exposing operation to a film loaded in said camera;

allowable shake amount determining means for detecting a maximum allowable amount of shaking after the generation of said first release signal after said first release signal generating means generates said first release signal and before said second release signal generating means generates said second release signal in accordance with said amount of shaking detected by said shake amount detecting means; and shutter-open enable signal generating means for comparing an output of said shake amount detecting means with an output of said allowable shake amount determining means after said second release signal generating means generates a second release signal, and outputting a shutter-open enable signal when a result of comparison indicates a predetermined relationship between said output of said shake amount detecting means and said output of said allowable shake amount determining means.

* * * * *